(12) United States Patent
Nakajima et al.

(10) Patent No.: US 7,107,256 B2
(45) Date of Patent: Sep. 12, 2006

(54) INFORMATION SEARCH SYSTEM, METHOD AND PROGRAM FOR USER SPECIFICATION OF RESULT RANKING CALCULATION

(75) Inventors: Mitsuru Nakajima, Kawasaki (JP); Akira Umebachi, Minato (JP)

(73) Assignee: Fujitsu Limited, Kawasaki (JP)

( * ) Notice: Subject to any disclaimer, the term of this patent is extended or adjusted under 35 U.S.C. 154(b) by 251 days.

(21) Appl. No.: 09/988,251

(22) Filed: Nov. 19, 2001

(65) Prior Publication Data

US 2002/0198870 A1 Dec. 26, 2002

(30) Foreign Application Priority Data

Jun. 19, 2001 (JP) .............................. 2001-184281

(51) Int. Cl.
*G06F 17/30* (2006.01)
(52) U.S. Cl. ..................... 707/3; 707/2; 707/4; 707/6; 707/7; 707/8; 707/10; 707/103 R
(58) Field of Classification Search .................... 707/5, 707/3, 4, 2, 1, 10, 104.1, 6, 7, 8, 103 R; 709/217
See application file for complete search history.

(56) References Cited

U.S. PATENT DOCUMENTS

| 5,457,794 A | * | 10/1995 | Azumatani et al. ............ 707/2 |
| 5,754,843 A | * | 5/1998 | Imanaka et al. ................ 707/5 |
| 5,850,433 A | * | 12/1998 | Rondeau ................ 379/218.01 |
| 5,873,080 A | * | 2/1999 | Coden et al. .................... 707/3 |
| 5,946,678 A | * | 8/1999 | Aalbersberg .................... 707/3 |
| 6,006,218 A | * | 12/1999 | Breese et al. ................... 707/3 |
| 6,014,664 A | * | 1/2000 | Fagin et al. .................... 707/5 |
| 6,230,204 B1 | * | 5/2001 | Fleming, III ................ 709/229 |
| 6,311,178 B1 | * | 10/2001 | Bi et al. ......................... 707/3 |
| 6,363,375 B1 | * | 3/2002 | Hoshino et al. ......... 707/103 R |
| 6,434,556 B1 | * | 8/2002 | Levin et al. .................... 707/5 |
| 6,460,036 B1 | * | 10/2002 | Herz ........................... 707/10 |
| 6,567,812 B1 | * | 5/2003 | Garrecht et al. ............. 707/100 |
| 6,721,410 B1 | * | 4/2004 | Will ....................... 379/202.01 |
| 6,741,188 B1 | * | 5/2004 | Miller et al. .............. 340/995.1 |
| 7,051,079 B1 | * | 5/2006 | Tanaka et al. ............... 709/217 |
| 2002/0065863 A1 | * | 5/2002 | Fruensgaard et al. ....... 709/100 |

(Continued)

FOREIGN PATENT DOCUMENTS

JP          11-143966           5/1999

(Continued)

OTHER PUBLICATIONS

Fagin, Ronald. "Combining Fuzzy Information from Multiple Systems." Procs. of the 15th ACM Symposium on Principles of Database Systems (PODS), Montreal, 1996, pp. 216-226. ACM Press.*

*Primary Examiner*—Thuy N. Pardo
(74) *Attorney, Agent, or Firm*—Staas & Halsey LLP

(57) ABSTRACT

An information search system enabling an information searcher to easily surely judge whether each piece of search target information searched is important to the searcher himself or herself. The information search system implements a function of calculating, when searching for property information on a real estate property that satisfies a search condition specified by a certain user, a degree of fitness indicating how much each piece of property information satisfies the search condition on the basis of a degree-of-fitness calculation function for that user, and a function of enabling each user to change a configuration of the degree-of-fitness calculation function for the user himself or herself.

12 Claims, 19 Drawing Sheets

U.S. PATENT DOCUMENTS

| | | | |
|---|---|---|---|
| 2002/0069190 A1* | 6/2002 | Geiselhart | 707/1 |
| 2002/0087632 A1* | 7/2002 | Keskar | 709/204 |
| 2002/0105532 A1* | 8/2002 | Oblinger | 345/701 |
| 2002/0152190 A1* | 10/2002 | Biebesheimer et al. | 707/1 |
| 2003/0065649 A1* | 4/2003 | Lucas et al. | 707/3 |

FOREIGN PATENT DOCUMENTS

JP      2000-35972      2/2000

* cited by examiner

|  |  | PRESENT STATE OF PROPERTY | | | | |
|---|---|---|---|---|---|---|
|  |  | LD | L&D | L | D | LorD |
| BUYER DESIRED CONDITIONS | LD | 1 | 1 | 0.6 | 0.5 | 0 |
|  | L&D | 1 | 1 | 0.6 | 0.5 | 0 |
|  | ONLY L | 1.2 | 1.2 | 1 | 0.8 | 0 |
|  | ONLY D | 1.2 | 1.2 | 1 | 1 | 0 |
|  | NOT REQUIRED | 1 | 1 | 1 | 1 | 1 |

FIG. 21

**\*\*\*REAL ESTATE BRANCH OFFICES**

URAWA BRANCH, OHMIYA BRANCH, TAKIHARA BRANCH, HONJO BRANCH, KUMAGAYA BRANCH, TAKASAKI BRANCH, ITABASHI BRANCH, IKEBUKURO BRANCH

**\*\*\* REAL ESTATE URAWA BRANCH OFFICE**

| IN-CHARGE PERSON | RAILWAY | NEAREST STATION | BY BUS and/or WALK (MIN.) | PRICE | LAYOUT | AREA | TYPE | PARKING | BUILT-YEARS | DEALER | DETAILS | NEGOTI-ATION PHASE | OPEN TO PUBLIC |
|---|---|---|---|---|---|---|---|---|---|---|---|---|---|
| UMEBAYAHSI | ODAKYU LINE | MACHIDA | 12 | 3600 | 3LDK | 88 | DETACHED HOUSE | PROVIDED | 11 | XXXXXXXX | DETAILS | NO ACCESS | ☐ |
| HARA | TOEI MITA LINE | TAKASHI-MADAIRA | 5 | 3950 | 4LDK | 95 | DETACHED HOUSE | PROVIDED | 8 | XXXXXXXX | DETAILS | OBSERVATION | ☐ |
| NAKAJIMA | OHEDO LINE | HIKARI-GAOKA | 9 | 3800 | 3LDK | 101 | DETACHED HOUSE | PROVIDED | 5 | XXXXXXXX | DETAILS | EXAMINATION OF DETAILED INFORMATION | ☐ |
| TAMAZAWA | SEIBU IKE-BUKURO LINE | KAMI-SHYAKUJII | 8 | 3450 | 4LDK | 99 | DETACHED HOUSE | PROVIDED | 8 | XXXXXXXX | DETAILS | NEGOTIATION ABOUT PRICE | ☐ |
| NAKANIWA | OHEDO LINE | NERIMA | 7 | 3200 | 4LDK | 88 | CONDO-MINIUM | NOT PROVIDED | 3 | XXXXXXXX | DETAILS | TEMPORARY APPLICATION FOR LOAN | ☐ |

70

INFORMATION SEARCH SYSTEM, METHOD AND PROGRAM FOR USER SPECIFICATION OF RESULT RANKING CALCULATION

BACKGROUND OF THE INVENTION

1. Field of the Invention

The present invention relates to an information search system and an information search method for searching one or more pieces of search target information that satisfies a certain search condition from plural pieces of search target information, a program for making a computer function as the information search system of the present invention, and a program for making the computer execute the information search method of the present invention. The present disclosure also relates to subject matter contained in Japanese Patent application No. 2001-184281 (filed on Jun. 19, 2001), which is expressly incorporated herein by reference in its entirety.

2. Description of the Related Art

With a spread of the Internet over the recent years, various categories of information can be obtained via the Internet, and there are developed a variety of search engines for searching a desired item of information from the Internet or from a certain Web site. Further, there exist some of the search engines, wherein a result of the search is presented to a searcher in the form of a list in which pieces of information searched are sorted out in the order corresponding to a matching degree (numerical data showing, e.g., how frequently keywords appear) between a search condition and the searched information.

In the case of presenting the result of the search as the list, the user usually can find out the information necessary to the user himself or herself simply by referring to some pieces of information at the head of the list.

The matching degree calculated by the search engine is not, however, invariably coincident with a user's matching degree between the search condition and the searched information. Hence, practically, the information more suited to the user might exist at the end of the list presented. It is therefore required that if searching the information extremely important to the user by making use of the conventional search engine, the search condition be set comparatively broad and all pieces of information searched be examined in detail.

Such an examination requires a long period of time, and hence, if, for example, a house to be purchased is determined based on the information opened to the public on the Internet, it happens that the same house has already been sold just when making a decision of buying this house.

Accordingly, it is a primary object of the present invention to provide an information search system and an information search method enabling an information searcher to easily surely judge whether each piece of search target information searched is important to the searcher himself or herself.

It is another object of the present invention to provide a program for making a computer execute the information search method of the present invention, and a program for making the computer function as the information search system of the present invention.

SUMMARY OF THE INVENTION

To accomplish the above objects, according to a first aspect of the present invention, an information search system comprises a searching unit which searches, when a desire-for-search party specifies a search condition, for a piece of search target information satisfying the search condition from plural pieces of search target information, a calculating unit which calculates a fitting value indicating how much the search target information satisfies the search condition about the respective pieces of search target information searched by the searching unit in accordance with a fitting value calculation procedure specified by the desire-for-search party, and a result-of-search presenting unit which presents, to the desire-for-search party, at least a part of information that forms each piece of search target information searched by the searching unit together with the fitting value calculated by the calculating unit with respect to that piece of search target information.

Namely, the information search system according to the first aspect of the present invention has an architecture enabling the desire-for-search party to specify the procedure of calculating the fitting value displayed together with (a part of) the search target information searched when presenting (when outputting a print and displaying) the result of the search to the desire-for-search party. Accordingly, the desire-for-search party determines the fitting value calculation procedure suited to the party itself and specifies this fitting value calculation procedure. If only these operations are done, it follows that the desire-for-search party is able to surely grasp how much each piece of search target information is important to the party itself simply by referring to the fitting value displayed together with the search target information. Further, if a quantity of the search target information increases, and if the content of the search target information is updated, it is feasible to promptly surely grasp how much the addition thereof or the updated content is important to the party itself.

Note that a method, by which the desire-for-search party specifies the fitting value calculation procedure on the occasion of actualizing the present information search system, is not particularly limited. For instance, the system may be configured so that the desire-for-search party specifies the fitting value calculation procedure before specifying the search condition. Moreover, there is no necessity of supplying the fitting value calculation procedure itself to the calculating unit in order to specify the fitting value calculation procedure. For example, the calculating unit may retain some pieces of information for defining the fitting value calculation procedure, and the desire-for-search party may also specify the use of the information of which the fitting value most preferable to the desire-for-search party is calculated.

According to a second aspect of the present invention, an information search system comprises a calculating unit which calculates, when a desire-for-search party specifies a search condition, a fitting value indicating how much search target information satisfies the search condition about the respective pieces of search target information in accordance with a fitting value calculation procedure specified by the desire-for-search party, an extracting unit for extracting the search target information of which the fitting value calculated by the calculating unit satisfies a predetermined condition, out of the plural pieces of search target information, and a result-of-search presenting unit which presents, to the desire-for-search party, at least a part of information that forms each piece of search target information extracted by the extracting unit together with the fitting value calculated by the calculating unit with respect to that piece of search target information.

Namely, the information search system according to the second aspect of the present invention has such an architecture that the fitting value is calculated based on the fitting value calculation procedure specified by the desire-for-search party with respect to all of the plural pieces of search target information set as the search targets, and thereafter the number of pieces of search target information presented to the desire-for-search party is restricted based on the fitting value calculated.

According to a third aspect of the present invention, an information search system comprises a defining information storage module stored with search condition defining information for defining a search condition with respect to each of a plurality of search permission parties, and fitting value calculation procedure defining information for defining a procedure for calculating a fitting value indicating how much the information searched under the search condition defined by the search condition defining information satisfies the search condition, a searching unit which searches, when a predetermined indication is given from any one of the plurality of search permission parties, for the search target information that satisfies the search condition defined by the search condition defining information stored in the defining information storage module with respect to the search permission party having given the predetermined indication out of the plural pieces of search target information, a calculating unit which calculates the fitting value indicating how much the search target information satisfies the search condition used for the search with respect to each piece of search target information searched by the searching unit in the procedure defined by the fitting value calculation procedure defining information stored in the search condition storage module with respect to the search permission party having given the predetermined indication, and a result-of-search presenting unit which presents, to the search permission party, at least a part of information that forms each piece of search target information searched by the searching unit together with the fitting value calculated by the calculating unit with respect to that piece of search target information.

Namely, the information search system according to the third aspect of the present invention, the fitting value calculation procedure defining information proper to the search permission party is just stored on the defining information storage module. With this storage, even when adding the information to and changing the search target information, each search permission party obtains the result of the search that contains the fitting value exhibiting a high reliability. It is therefore feasible to promptly specify the information suited to the party itself from, for instance, the information suite in which the updating is frequently carried out without confirming contents of futile bits of information.

The information search system according to the third aspect may further comprise a second calculating unit which calculates, when the search target information to be processed is given, the fitting value indicating how much the search target information to be processed satisfies the search condition stored in the defining information storage module about the search permission party with respect to each of the plurality of search permission parties in the procedure defined by the fitting value calculation procedure stored in the defining information storage module with respect to that search permission party, and a result-of-search output unit for outputting, to each of the plurality of the search permission parties, the information on this search permission party and the fitting value calculated by the second calculating unit with respect to this search permission party.

In the information search system according to the third aspect that adopts the architecture described above, the search permission party requiring a certain item of search target information most, can be specified based on the output of the result-of-search output unit. Hence, the search target information is set as, for example, information on a commercial article for sale, and the output of the result-of-search output unit is supplied to a dealer of this article, thereby actualizing the system capable of performing the position sales.

Further, in the information search system according to the third aspect, the plural pieces of search target information may contain first type search target information permitted to be browsed by the search permission party, and second type search target information inhibited to be browsed by the search permission party, the searching unit may search for the search target information from the first type search target information contained in the plural pieces of search target information. The information search system may further comprise a second calculating unit which calculates, when the search target information to be processed is given, the fitting value indicating how much the second type search target information to be processed satisfies the search condition stored in the defining information storage module about the search permission party with respect to each of the plurality of search permission parties in the procedure defined by the fitting value calculation procedure stored in the defining information storage module with respect to that search permission party, and a result-of-search output unit for outputting, to each of the plurality of the search permission parties, the information on this search permission party and the fitting value calculated by the second calculating unit with respect to this search permission party.

In the information search system according to the third aspect that adopts the architecture described above, the specified search target information (the second type search target information) is kept undisclosed to the public, and the search permission party requiring the second type search target information most can be specified based on the output of the result-of-search output unit. It is therefore possible to actualize the system suitable especially for selling the real estate.

According to a fourth aspect of the present invention, an information search method comprises a searching step of searching, when a desire-for-search party specifies a search condition, for a piece of search target information satisfying the search condition from plural pieces of search target information, a calculating step of calculating a fitting value indicating how much the search target information satisfies the search condition about the respective pieces of search target information searched in the searching step in accordance with a fitting value calculation procedure specified by the desire-for-search party, and a result-of-search presenting step of presenting, to the desire-for-search party, at least a part of information that forms each piece of search target information searched in the searching step together with the fitting value calculated by the calculating unit with respect to that piece of search target information.

According to a fifth aspect of the present invention, an information search method comprises a calculating step of calculating, when a desire-for-search party specifies a search condition, a fitting value indicating how much search target information satisfies the search condition about the respective pieces of search target information in accordance with a fitting value calculation procedure specified by the desire-for-search party, an extracting step of extracting the search target information of which the fitting value calculated in the calculating step satisfies a predetermined condition, out of the plural pieces of search target information, and a resultof-search presenting step of for presenting, to the desire-for-search party, at least a part of information that forms each piece of search target information extracted in the extracting step together with the fitting value calculated in the calculating step with respect to that piece of search target information.

Hence, according to these information search methods, the same effects as those in the case of using the information search systems according to the first and second aspects of the present invention, can be obtained.

A program according to the present invention is structured so that a computer can execute the information search method according to the present invention, or the computer functions as the information search system of the present invention. Accordingly, when using the program of the present invention, it is feasible to promptly specify, for an information searcher, the search target information important to the searcher from the plural pieces of search target information by use of the typical computer, and to provide a platform on which it is possible to easily surely judge whether a newly added piece of search target information is important to the searcher.

BRIEF DESCRIPTION OF THE DRAWINGS

These and other objects and advantages of the present invention will become clear from the following description with reference to the accompanying drawings, wherein:

FIG. 21 is an explanatory diagram showing a property detail page displayed on the target terminal.

DETAILED DESCRIPTION OF THE PREFERRED EMBODIMENTS

Embodiments of the present invention will hereinafter be described with reference to the accompanying drawings.

Figure 1:
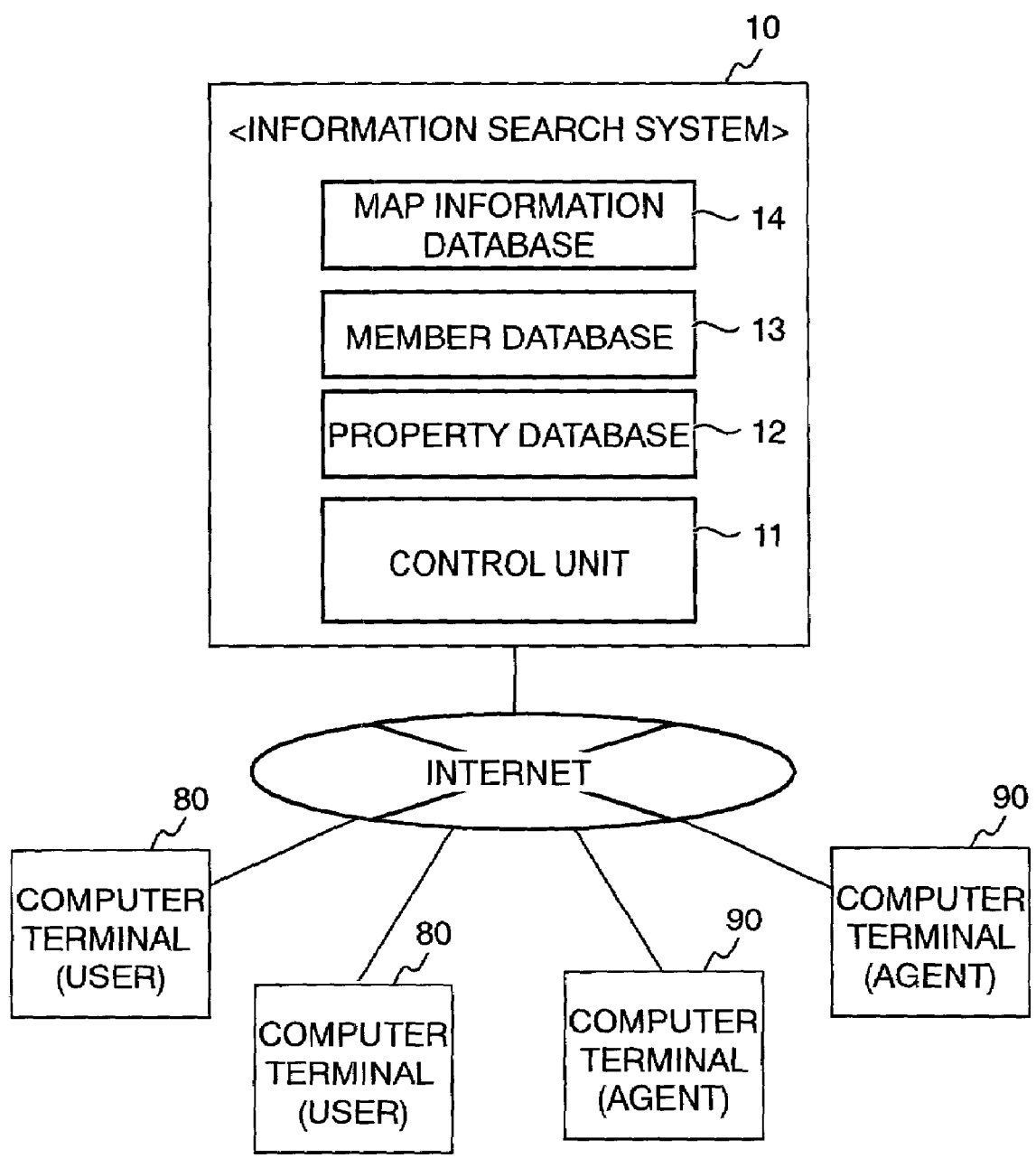
FIG. 1 is an explanatory diagram showing an outline of an architecture of an information search system and a usage mode thereof in one embodiment of the present invention.

To start with, an outline of an information search system in one embodiment of the present invention will be explained referring to FIG. 1.

The present information search system 10 is a system for performing a service for providing a Web page containing pieces of information on real estate properties suitable for a prospective purchaser (who will hereinafter be called a user) for the real estate property to this user having an access to this system via a computer terminal 80 capable of browsing the Web pages. The information search system 10 is also a system for carrying out a service for providing a real estate agent accessing this system via a computer terminal 90 capable of browsing the Web pages with a Web page containing pieces of information on the users suited to receiving information on the real estate properties dealt with by this real estate agent. Further, the information search system 10 is a system in which the users allowed to utilize all the functions of the system are limited to users who make a predetermined membership registration procedure (these registered users will hereinafter be called members).

The information search system 10 is actualized by installing various categories of programs and data into a comparatively highly functional computer. The information search system 10 includes, as main components, a circuit suite (a CPU, a ROM, a RAM, a communication control circuit and so on) functioning as a control unit 11 on the whole, an property database 12, a member database 13 and a map information database 14 which are stored on an HDD (not shown in the figure).

Next, structures and applications of the databases incorporated into the information search system 10 will be explained.

The map information database 14 is a database stored with data about locations of a variety of facilities (food shops, banks, schools etc.) and with timetable data of trains and buses. The control unit 11 refers to this map information database 14, thereby executing a process of calculating a station-to-station necessary time, and a time required for accessing the school or house from the station by walk or bus, and a process of obtaining types and the number of shops existing in the vicinity of a certain real estate property.

Figure 2:
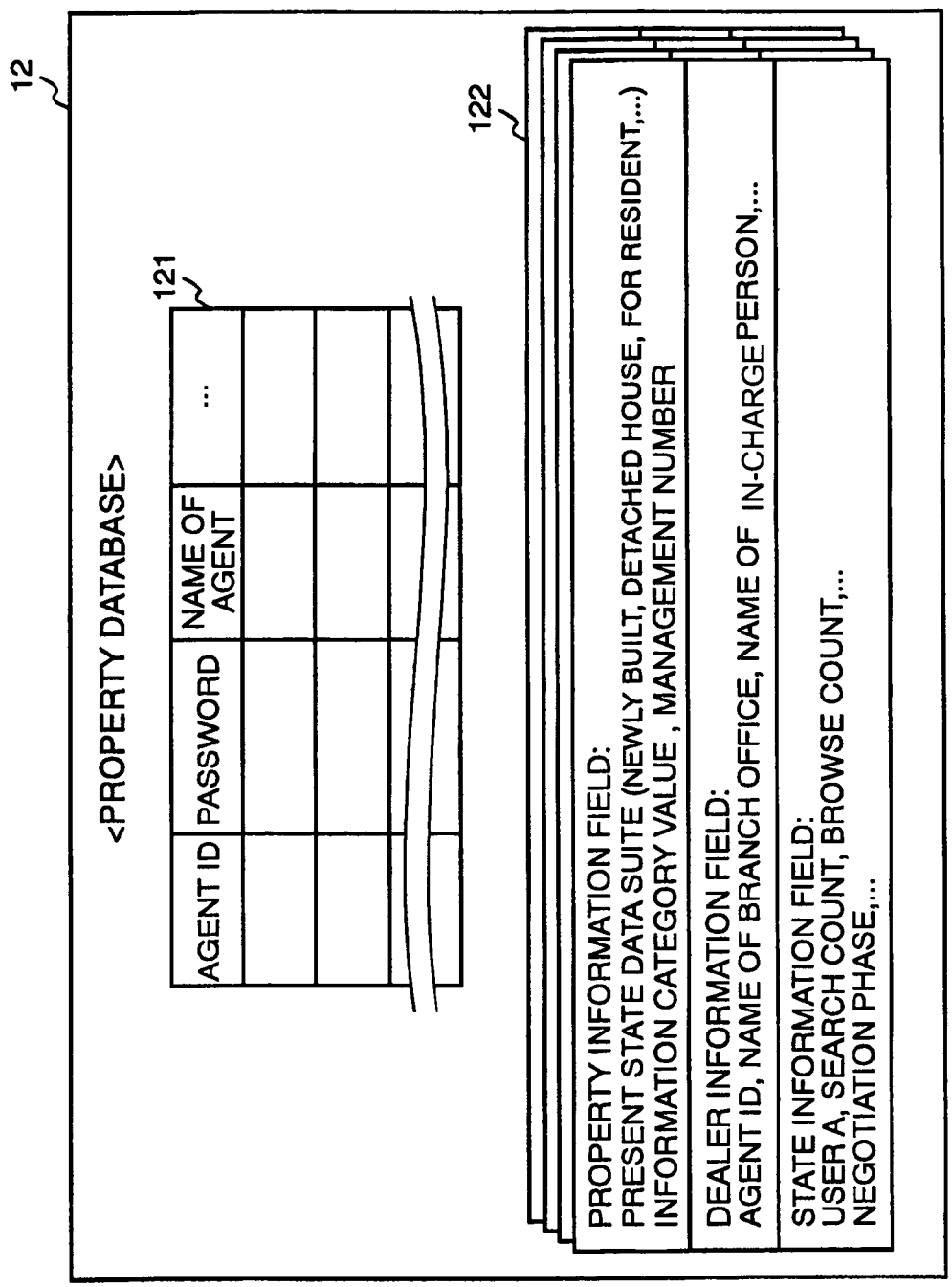
FIG. 2 is an explanatory diagram showing a property database retained by the information search system in the embodiment.

The property database 12 is, as schematically shown in FIG. 2, a database retaining one agent management table 121 and a plurality of property management records 122.

The agent management table 121 is a table stored with records of real estate agents each dealing the real estate properties by utilizing the present information search system 10, each agent record consisting of a name of the real estate agent, and an agent ID and a password given to the real estate agent.

The property management record 122 is a record registered (added) by the control unit 11 per property in the property database 12. The record 122 has a property information field, a dealer information field and a state information field.

The property information field is a field stored with plural items of present state data indicating a present state of the real estate property, an information category value by which self-property information comes under one of categories such as general property information opened also to non-member users, special property information opened to only the members and non-disclosure property information not opened to the public (but opened to only specified members), and a management number defined as property identifying information. The property information filed is stored with, though giving all pieces of present state data stored in this field is herein omitted, a present state data showing that the property is any one of an estate, a detached house, a building, a condominium and an apartment, a present state data showing that the property is offered with a purpose of any one (or both) of rental and sales, a present state data indicating a sales/rental price of the property, and a present state data indicating a location of the property, and a present state data indicating a station nearest to the property. Further, the property information field relative to the building is stored with a present state data indicating the number of years since it was built, a present state data indicating a layout of the house (e.g. three private rooms, a living room, a dinning room and a kitchen (=3 LDK)), a present state data indicating a structure (made of steel-frame concrete, reinforced concrete, wood etc.), a present state data showing a style of the building, a Japanese style or a Western-style or a half-Japanese/half-Western style, and a present state data showing a color of an outside wall. Moreover, the property information field is stored with a present state data for displaying graphics of the layout and an external configuration of the building (or house) and a land shape.

The dealer information field is a field stored with an agent ID of the real estate agent registered in the property management record 122, a name of a branch office and a name of a person in charge of dealing with the property concerned in the real estate agent.

The state information field is a field stored with pieces of information (a search count, a detailed information browse count etc.) indicating a state of every user access to the real estate property information. Though a detailed description will be given later on, when a certain user (member) searches for an property, the state information field related to each searched property is stored with such an item of information that a user search count becomes "1" (this user searches for the property concerned for the first time) or that the user search count is incremented by 1. Further, when a certain user (member) browses detailed information on a certain property, the state information field relative to the property is stored with such an item of information that the user detailed information browse count is incremented. Moreover, if a predetermined request is given from the real estate agent, the state information field is stored with a piece of information showing the level of the progress of the negotiation.

Figure 3:
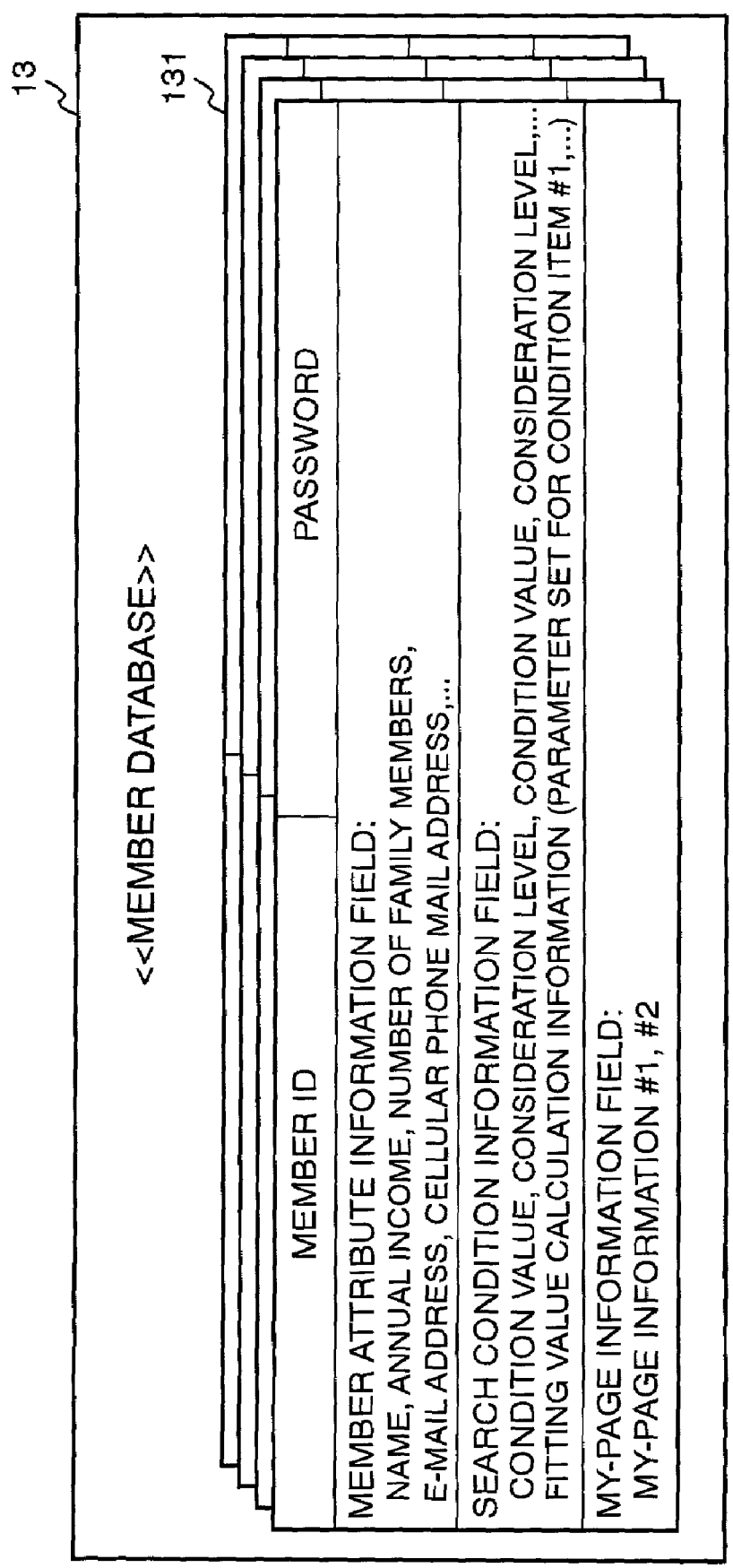
FIG. 3 is an explanatory diagram showing a member database retained by the information search system in the embodiment.

The member database 13 is a database that retains a suite of member records 131 of a plurality of members as schematically shown in FIG. 3.

The member record 131 is a record registered (added to) in the member database 13. The member record 131 has two fields for storing a member ID and a password, a member attribute information field for storing member attribute information, a search condition information field for storing search condition information, and a my-page information field for storing some sets of my-page information.

The member ID and the password are unique information, for authenticating a user identity, which are given to a user when making a membership registration procedure. The member attribute information is information that contains a name, an address, an E-mail address, the number of family members and an annual income of the user, which are obtained in the membership registration procedure from the user.

The search condition information is information that defines conditions for searching the property information from the property database 12, and also defines a algorithm for calculating a fitting value to each item of property information searched. The fitting value is a piece of numerical value information displayed together with a part of the property information in order to notify the user a degree of how much the property information searched satisfies a desire of the user. Though the details of the search condition information and the fitting value will be described later on, according to the present information search system 10, the member record 131 is stored with the search condition information consisting of set values (condition values and consideration levels) set by the user with respect to plural categories of condition items, and fitting value calculation information defined as an aggregation of parameter sets for calculating a fuzzy fitting value. Further, seven types of fitting values (a synthetic fitting value and six pieces of type-based fitting values) are calculated for every item of property information searched.

The my-page information is information for re-displaying later on a result-of-search list page 30 (see FIG. 9) and a property detail page 40 (see FIG. 10). The my-page information is stored in the member record 131 when the user (member) gives an indication of saving the displayed page.

Hereinafter, based on what has been described so far as a premise, an operation of the control unit 11 in the present information search system 10 will be explained in depth.

The operation of the control unit 11 is roughly classified into an operation with respect to accessing from the user and an operation with respect to accessing from the real estate agent. To begin with, the former operation will be described.

When utilizing the present information search system 10, the user (the member or non-member) operates the computer terminal 80 to transmit an HTTP (HyperText Transfer Protocol) request (that is hereinafter be called a top page request) having a predetermined content, which is to be received by the control unit 11. Namely, the user boots a Web browser on the computer terminal 80 and performs an operation such as inputting a predetermined URL (Uniform Resource Locator).

Figure 4:
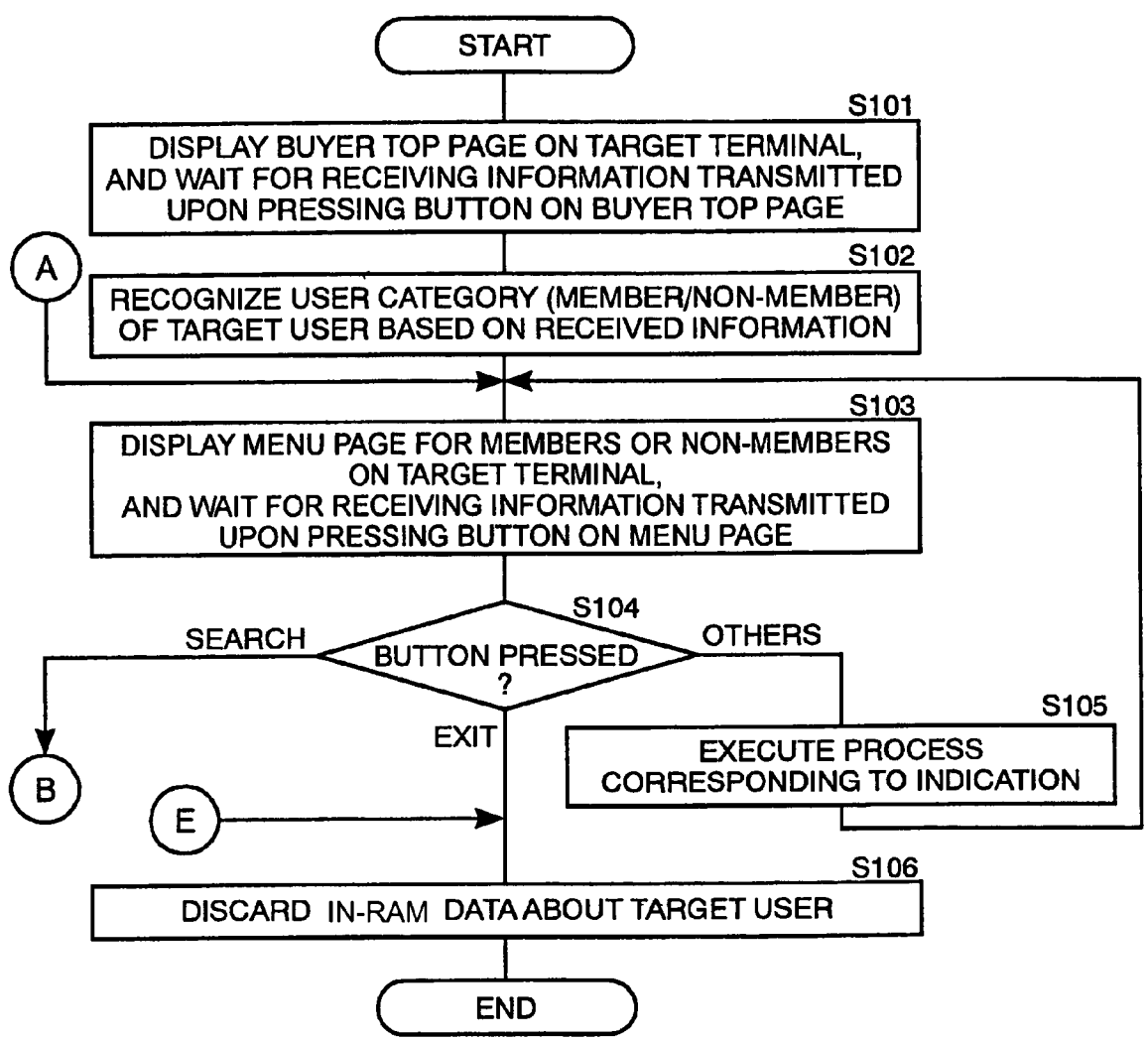
FIG. 4 is a flowchart showing operating steps of a control unit receiving a top page request.
Figure 5:
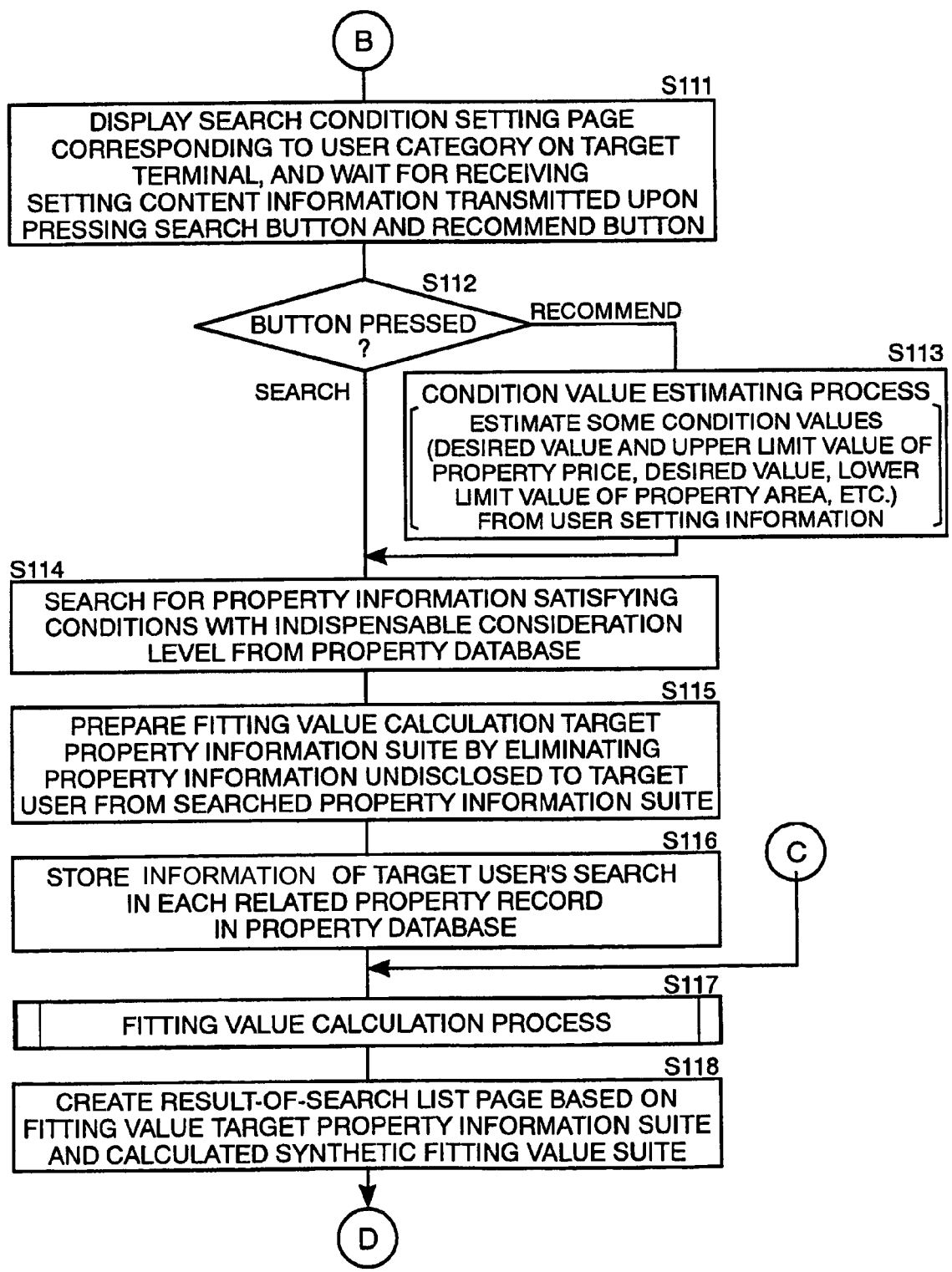
FIG. 5 is a flowchart continued from FIG. 4, showing the operating steps of the control unit receiving the top page request.
Figure 6:
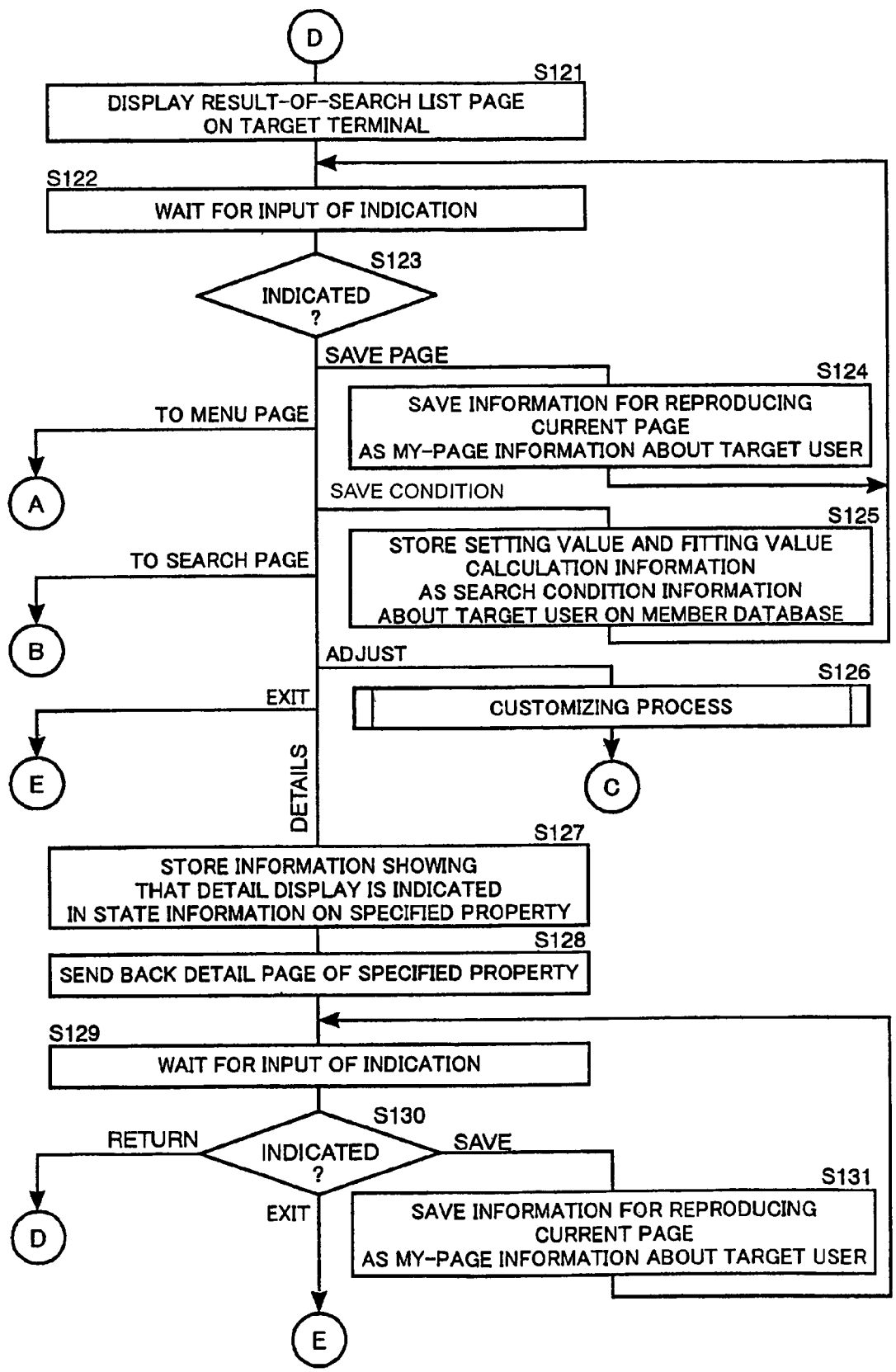
FIG. 6 is a flowchart continued from FIG. 5, showing the operating steps of the control unit receiving the top page request.

FIGS. 4 through 6 show steps of the operation of the control unit 11 having received the top page request.

As shown in FIG. 4, in step S101, the control unit 11 having received the top page request executes a process of displaying a buyer top page on the computer terminal 80

(which will hereinafter be referred to as a target terminal) having transmitted the top page request. Then, the control unit 11, in the same step S101, waits for information that is transmitted from the target terminal when a button on the buyer top page is pressed.

The buyer top page displayed on the target terminal (Web browser) by the control unit 11 is provided with a non-member button that should be pressed by the non-member user. Further, the buyer top page is provided with a member ID input box, a password input box, and a log-in button that should be pressed by the member user after inputting the member ID and the password to two input boxes. The target terminal displaying this buyer top page, when the non-member button is pressed, transmits onto the Internet the predetermined-formatted information (the HTTP request) for notifying the control unit 11 that the non-member button is pressed. Moreover, when the log-in button is pressed, the target terminal transmits onto the Internet the predetermined-formatted information for notifying the control unit 11 of the member ID and the password inputted to the two input boxes as well as that the log-in button is pressed.

The control unit 11, when receiving any one of these two types of information transmitted by the target terminal, finishes step S101. Then, the control unit 11, in step S102, recognizes user category (information showing whether user is member or non-member) of the user who manipulates the target terminal (who will hereinafter be called target user) on the basis of the information received, and thereafter starts executing processes from step S103 onwards.

Note that the control unit 11, when the information containing the member ID and the password is transmitted, tries to confirm in step S102 that a combination of the member ID and the password are stored in the member database 13. Then, the control unit 11, if capable of confirming that this combination is stored in the member database 13, finishes the step S102 and starts executing the processes from step S103 onwards. Whereas if incapable of confirming that this combination is stored in the member database 13, the control unit 11, does not start the processes from step S103 but executes a process of making the target terminal display a Web page for prompting the user to re-input the-member ID and the password in step not shown in FIG. 4. Thereafter, in step S102, the control unit 11 again waits for the information from the target terminal, caused by manipulation of the target user.

In step S103, the control unit 11 executes a process of displaying on the target terminal a members- or a non-members-oriented menu page for the according to the user category. Namely, the control unit 11 displays on the target terminal, if the user is categorized as the non-member, the non-members-oriented menu page and, if the user is the member, the members-oriented menu page. Then, the control unit 11 waits for receiving of the information caused by the user's manipulation on the members- or non-members-oriented menu page for the target terminal.

The members-oriented menu page displayed on the target terminal by the control unit 11 is provided with a search button pressed by the user when desiring to search for the property, a my-page browse button pressed by the user when browsing the pages stored, a help button pressed by the user when desiring to refer to a description of a usage of the information search system 10, and an exit button pressed by the user when finishing the use of the information search system 10. Further, the non-members-oriented menu page is substantially the same as the member-oriented menu page except that the my-page browse button does not function.

The target terminal displaying the members- or non-members-oriented menu page, when a certain button on the menu page is pressed, transmits to the control unit 11 the information corresponding to the pressed button.

When receiving the information showing that the exit button is pressed (step S104: EXIT), the control unit 11 discards the data (such as the fitting value calculation information, etc.: its details will be mentioned later on) stored on the RAM in order to respond a request from the target user (step S106), and finishes the process for the target user.

When receiving the information indicating that the my-page browse button or the like is pressed (step S104; OTHERS), the control unit 11 executes a process of transmitting the Web page showing the description of the usage back to the target terminal, and a my-page display process (its details will be explained later on) in step S105. Then, after completing such processes, the control unit 11 returns to step S103, wherein the control unit 11 displays the menu page once again on the target terminal.

Further, when receiving the information showing that the search button is pressed (step S104; SEARCH), the control unit 11, as shown in FIG. 5, makes the target terminal display the search condition setting page by transmitting the HTML data etc., and waits for the button on the search condition setting page to be pressed by the target user (step S111).

This search condition setting page is provided with a multiplicity of condition setting control boxes (such as a check box, a select box, a numerical value input text box etc.) for setting condition values and consideration levels in plural categories of condition items. The search condition setting page is further provided with several information setting control boxes (such as a check box, a select box, a numerical value input text box etc.) for setting an annual income, an afford-to-live value, the number of family members etc., and a variety of buttons (a recommend button, a search button, a return button etc.).

Further, each of the condition items in which the user is able to set the condition values and the consideration levels on this search condition setting page, comes under any one of six categories such as an equipment category, a commute-to-office category, a commute-to-school category, a town scene category, a shopping category and a public facility category of which category-based fitting values are to be calculated.

Though enumeration of all the condition items is omitted, as the condition items coming under the equipment category, prepared are a condition item to which a condition value (which will hereinafter be called an property category value) is set, indicating that the property of which the property information desired by the user to be submitted (which will hereinafter be called a submission target property) is one of the condominium, the apartment, the detached house, the estate and the building, a condition item to which condition values (a desire value and an upper limit value) relative to a purchase price and a rental fee of the submission target property are set, a condition item to which condition values (a desire value and a lower limit value) relative to an area such as a total floor space/occupancy area, a size of each room and so on of the submission target property are set. Moreover, the condition items coming under the equipment category includes a condition item for indirectly specifying a road-sided direction (data indicating which direction of property faces road) of the submission target property, to be specific, a condition item to which the user is able to set an assessment point (an property facing to the road on the south side is given 100 points as an assessment point) as a condition value of the property facing to the road on the north side.

Further, the condition items coming under the commute-to-office category includes a condition item for pinpointing a location of the submission target property by use of the administrative divisions of Japan, the municipal districts, towns and villages, the nearest station, the nearest route and so on, and condition items for imposing the location of the submission target property a condition that the nearest station be the station of origin, a condition about a necessary time taken from the nearest station and a condition about a necessary time taken from the nearest station at the working place (the condition item in which a name of the station is set as a condition value, and the condition item in which an upper limit value of the necessary time is set as a condition value).

The condition items coming under the commute-to-school category include condition items for imposing the location of the submission target property a condition about a necessary time taken from the nearest school, and a condition about a necessary time taken from the nearest station at the school.

The condition items coming under the town scene category include a condition item for defining conditions that should be met by the submission target property in terms of a classification of the town (such as a large-scale factory town, an office town, a residential area etc.) where the property exists, and a condition item for defining the should-be-met-by-the-property conditions in terms of a housing density and natural environments (such as public parks, the rivers, the sea and so forth that should exist in the vicinity of the property).

The condition items coming under the shopping category includes a variety of condition items for defining the conditions that the property is desired to have in terms of the number of food shops (such as a fish shop, a meat shop, a fruit and vegetable shop, a supermarket etc.), the number of restaurants (such as a so-called restaurant, a sushi-restaurant, a Chinese noodle restaurant, a Chinese restaurant etc.), the number of other stores (a barber shop, a beauty shop, an electric appliance shop, a furniture shop, a clothing shop etc.) and whether a convenience store exists or not.

The condition items coming under the public facility category include a variety of condition items for defining the conditions that the submission target property is desired to have in terms of the number of medical facilities and the number of financial institutions existing in the vicinity thereof.

As the consideration levels that the user is able to enter in the respective condition items on the search condition setting page, prepared are five consideration levels named "non-consideration", "better", "important", "indispensable" and "extra". Details of processing executed with using these consideration levels will also be explained later on, the user sets "non-consideration" to the condition items related to the conditions that are not necessary to be satisfied, and sets "better" and "important" to the condition items related to the conditions that are preferably and desirably satisfied, respectively. Further, the user sets "indispensable" to the condition items related to the conditions that are necessary to be satisfied. The user sets "extra" to the condition items related to the conditions that are desirable, but not necessary, to be satisfied.

Note that the control unit 11, in step S111, displays on the target terminal the search condition setting page of which the contents corresponds to the user categories. More specifically, if the target user is the member, the control unit 11 displays on the target terminal the search condition setting page on which an initial state of each information setting control box is set corresponding to the member attribute information on the target user stored on the member database 13. Further, the control unit 11 also executes a process of, if the member database 13 is stored with the search condition information relative to the target user, setting as what corresponds to the search condition information an initial state of each condition setting control box on the search condition setting page displayed on the target terminal. While on the other hand, if the target user is the non-member, the control unit 11 displays on the target terminal the search condition setting page on which the initial state of each control box is set in a state with nothing set.

The target terminal displaying the search condition setting page executes a process of changing the states (the condition values, the consideration levels, annual incomes etc. in the condition items) of the respective condition setting control boxes and information setting control boxes in accordance with user's indications (user's manipulations of the keyboard and mouse). Then, the target terminal, when the search button or the recommend button is pressed, confirms that the indispensable information is set, and thereafter transmits to the control unit 11 information containing setting content information indicating a setting content at that point of time and information showing the button pressed. Incidentally, explanations of the operations of the target terminal and of the control unit 11 when pressing other button (the return button and so on) provided on the search condition setting page, are herein omitted.

When receiving the setting content information transmitted upon pressing the search button (step S112; SEARCH), the control unit 11 starts processes from Step S114 onwards. On the other hand, when receiving the setting content information transmitted upon pressing the recommend button (step S112; RECOMMEND), the control unit 11 executes a process of estimating a condition value (step S113), and thereafter starts processes from step S114 onwards.

The operation of the control unit 11, when executing this condition value estimating process, differs depending on the set property category-based value, and hence, the content of the condition value estimating process will be explained by exemplifying herein a case where the property category-based value shows a condominium or a detached house with a lot.

In this case, a desired value and an upper limit value of the property price are estimated based on an annual income or an afford-to-live value. A lower limit value and a desired value of the area of the property, a lower limit value and a desired value of the layout of the house, and a lower limit value and a desired value of an individual room space of the property, are estimated from the number of the family members.

To be specific, the control unit 11, if the annual income is given, calculates 3- and 5-fold values of the annual income, and stores these values as the desired value and the upper limit value of the property price (when the annual income is ¥7,000,000, the property price desired value=21,000,000, and the property price upper limit value=35,000,000). Further, the control unit 11, if the afford-to-live value is given, calculates 17.5-and 10.5-fold values of the afford-to-live value, and stores these values as a desired value and an upper limit value of the property price (when the afford-to-live value is ¥2,000,000, the property price desired value=21,000,000, and the property price upper limit value=35,000,000).

Moreover, the control unit 11 calculates an area lower limit value and an area desired value in the following formulae:

Area Lower Limit Value=5-Mats×the Householder+
5-Mats×the Number of Children/2+5-Mats×
Parent Household+$L$6-Mats+$D$5-Mats+$K$3-Mats+
Specified Storeroom Mat-Count Area Lower Limit Value=8-Mats×the Householder+
8-Mats×the Number of Children+8-Mats×Parent
Household+L 8-Mats+$D$6-Mats+$K$4-Mats+
Specified Storeroom Mat-Count Further, the control unit 11 estimates the lower limit value of the layout of the house from "LDK+(the Householder and the Number of Parent Households+the Number of Children/2) Rooms", and the desired value of the layout of the house from "LDK+(the Householder and the Number of Parent Households+the Number of Children) Rooms".

Moreover, the control unit 11 estimates the lower limit values and the desired values of the spaces of the respective rooms such that the head of family is given a 5-mats (the lower limit value) or 8-mats (the desired value) bedroom, the first child is given a 5-mats (the lower limit value) or 8-mats (the desired value) room, the second child is given a 0-mat (the lower limit value) or 8-mats (the desired value) room, and the parent household is given a 5-mats (the lower limit value) or 8-mats (the desired value) room. Further, the control unit 11 estimates the lower limit values and the desired values of the spaces of other rooms such that the living room (L) is given a 6-mats (the lower limit value) or 8-mat (the desired value) space, the dinning room (D) is given a 5-mats (the lower limit value) or 6-mat (the desired value) space, the kitchen (K) is given a 3-mats (the lower limit value) or 4-mat (the desired value) space, and the storeroom (S) is given a 0-mat (the lower limit value) or specified storeroom mat-count (the desired value) space.

Then, the control unit 11 adds the respective estimated condition values and the information showing that the attribute level relative to each condition value is "indispensable", to the setting content information received from the target terminal. Subsequently, the control unit 11 finishes the condition value estimating process and executed processes from step S114 onwards.

In step S114, the control unit 11 searches, from the property database 12, for the property information that satisfies all the conditions indicated by the condition values with the consideration level being "indispensable" in the setting content information at that point of time.

Subsequently, the control unit 11, based on the user categories and the information category-based value contained in each searched item of property information, removes the property information that can not be disclosed to the target user out of the searched property information suite, thereby presenting a fitting value calculation target property information suite (step S115).

Namely, the control unit 11, if the user is the member, eliminates the non-disclosure property information (not opened to the public by the seller) from the searched property information suite, and treats a remaining property information suite as a fitting value calculation target property information suite. By contrast, if the user is the non-member, the control unit 11 removes pieces of information such as the non-disclosure property information and the special property information (opened to only the members) out of the searched property information suite, and treats a remaining property information suite as a fitting value calculation target property information suite.

Then, the control unit 11 updates the state information corresponding to each item of property information constituting the fitting value calculation target property information suite within the property database 12, then stores the information that the target user made the search (the search count is incremented by "1") (step S116), and thereafter starts a fitting value calculation process (step S117).

Figure 7:
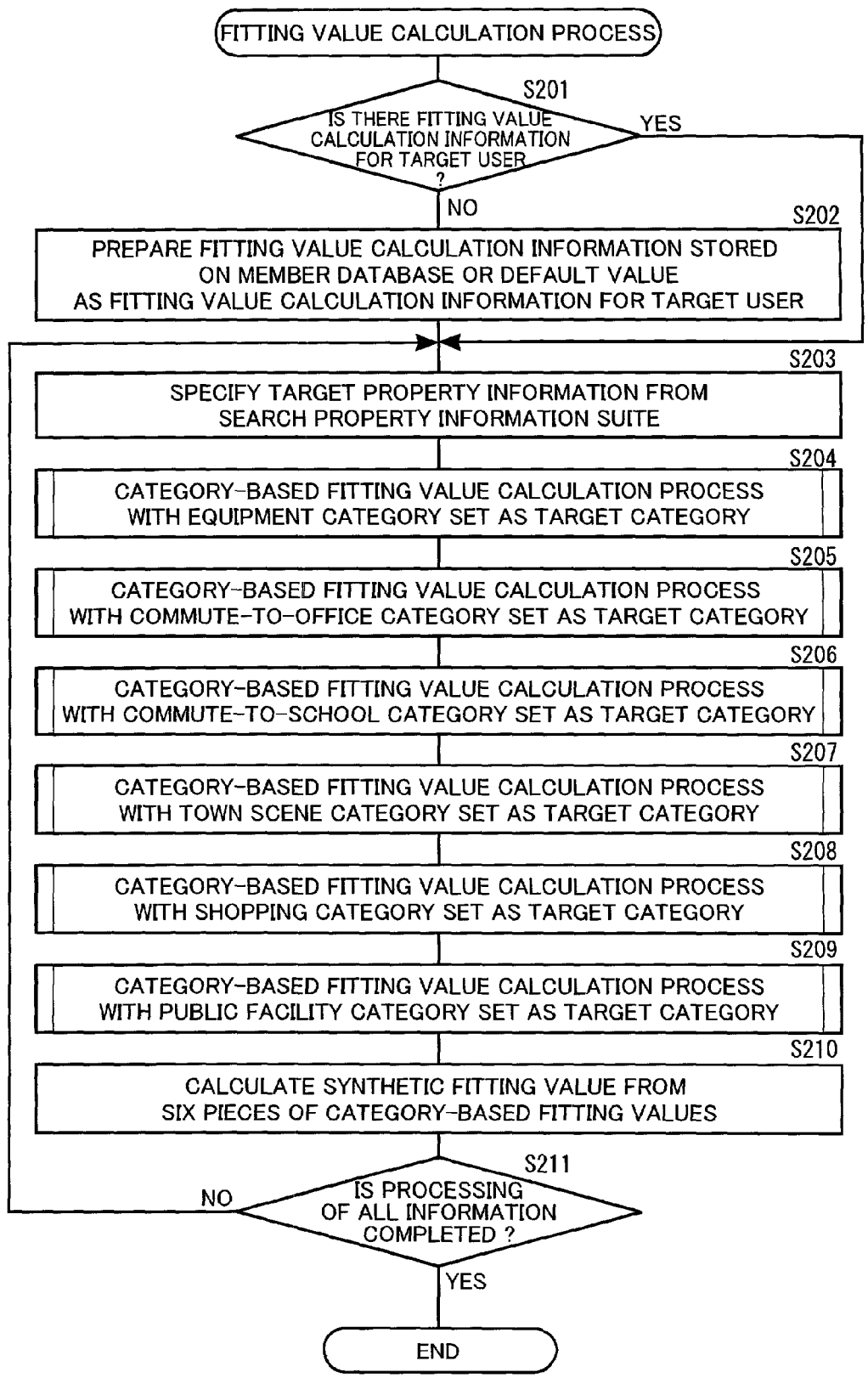
FIG. 7 is a flowchart showing a fitting value calculation process executed by the control unit.

As shown in FIG. 7, when executing the fitting value calculation process, the control unit 11 judges whether the RAM has already been stored with the fitting value calculation information (the aggregation of the parameter sets required for calculating the fitting value) for the target user (step S201). Then, if the fitting value calculation information for the target user is stored on the RAM (step S201; YES), the control unit 11 starts executing a loop of processes in steps S203 through S211 in order to actually calculate various fitting values.

Whereas if the fitting value calculation information for the target user is not stored on the RAM (step S201; NO), the control unit 11 executes the following process in step S202.

The control unit 11, if the target user is the non-member, stores the RAM with a copy of the fitting value calculation information given as default information and serving as the fitting value calculation information for the target user. Then, the control unit 11 finishes step S202 and starts executing the loop of processes in steps S203 through S211.

By contrast, if the target user is the member, the control unit 11 judges whether the fitting value calculation information on the target user is stored on the member database 13. If the fitting value calculation information on the target user is stored on the member database 13, the control unit 11 stores the RAM with a copy thereof as the fitting value calculation information for the target user. Whereas if not, the control unit 11 stores the RAM with the copy of the fitting value calculation information given as the default information and serving as the fitting value calculation information for the target user. Then, the control unit 11 finishes step S202 and begins executing the loop of processes in steps S203 through S211.

At the startup of executing the loop of processes in steps S203 through S211, the control 11 at first specifies (selects), as an item of target property information, one item of property information (not yet processed) contained in the fitting value calculation target property information suite (step S203).

Next, the control unit 11 executes a category-based fitting value calculation process of the specified target property information, in which the target categories are the equipment category, the commute-to-office category, the commute-to-school category, the town scene category, the shopping category and the public facility category (steps S204 to S209).

Figure 8:
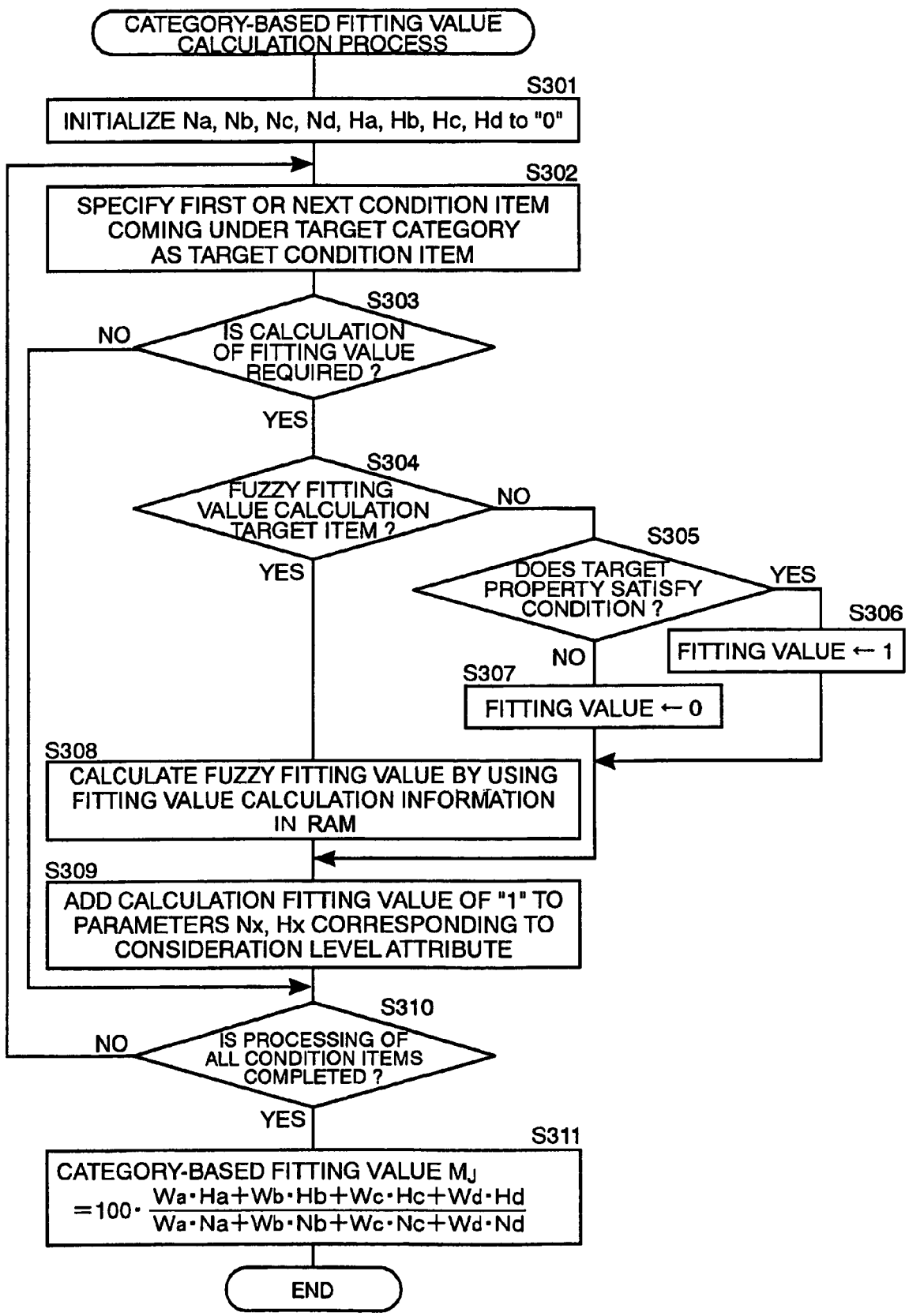
FIG. 8 is a flowchart showing a category-based fitting value calculation process executed by the control unit.

As shown in FIG. 8, when executing the category-based fitting value calculation process, the control unit 11, to start with, initializes parameters N, Nb, Nd, Ha, Hb, Hc and Hd for storing pieces of numerical value information to "0" (step S301). Note that the parameters Na, Nb, Nc and Nd are parameters for storing, when finishing the loop of processes in steps S302 through S310, respective total numbers of the condition items with the consideration levels being "better", "important", "indispensable" and "extra". Further, the parameters Ha, Hb, Hc and Hd are parameters for storing, when finishing the loop of processes in steps S302 through S310, respective total sums of the fitting values with respect to the condition items with the consideration levels being "better", "important", "indispensable" and "extra".

After initializing the parameters N1 and others, the control unit 11 specifies, as a target condition item, the first condition item coming under the target category (step S302), and judges whether this target condition item is the one of which the fitting value should be calculated (the consideration level is not "non-account" (step S303).

If judging that the target condition item has no necessity of calculating the fitting value (step S303; NO), the control unit 11 judges whether there remains an unprocessed condition item. Then, the control unit 11, if the unprocessed condition item is left (step S310; NO), loops back to step S302 and specifies a next condition item coming under the target category as a target condition item.

Whereas if judging that the target condition item has the fitting value that should be calculated (step S303; YES), the control unit 11 judges whether the target condition item is a fuzzy fitting value calculation target condition item of which a fuzzy fitting value should be calculated (step S304).

If the target condition item is note the fuzzy fitting value calculation target condition item (step S304; NO), the control unit 11 judges referring to the target property information whether the target property satisfies the conditions specified with respect to the target condition item (step S305). Then, if the target property satisfies the conditions (step S305; YES), the control unit 11 stores "1" as a fitting value relative to the target condition item (step S306). Whereas if not satisfied (step S305; NO), the control unit 11 stores "0" as a fitting value relative to the target condition item (step S307). Note that according to the present information search system 10, the great majority of condition items are set as the fuzzy fitting value calculation target items, and the condition items with the fitting values determined by the processes in steps S305 through S307 are limited to those hard to take the fuzzy fitting values (such as a condition item for specifying applications of the building, wherein it is hard to assume a case that the fitting value should be a value excluding 0 and 1).

While on the other hand, if the target condition item is the fuzzy fitting value calculation target item (step S304; YES), the control unit 11 calculates a fuzzy fitting value (which will hereinafter be simply called a fitting value) with respect to the target condition item in fuzzy fitting value calculation steps determined for the target condition item (step S308). The calculation of the fuzzy fitting value in step S308, though its details will be explained later on, involves the use of (some pieces of) the fitting value calculation information for the target user, which is stored on the RAM at that point of time.

In any one of steps S306~S308, the control unit 11 having obtained the fitting value with respect to the target condition item adds the obtained fitting value and "1" to parameters Nx (x=one of a, b, c, d) and Hx corresponding to the consideration levels of the target condition item (step S309). Thereafter, the control unit 11 judges in step S310 whether the unprocessed condition item remains. If the unprocessed condition item is left, the control unit 11 executes the processes from step S302 for the next condition item.

Then, the control unit 11, when completing the processes with respect to all the condition items coming under the target category (step S310; YES), calculates a category-based fitting value $M_J$ relative to the target category in the formula (1) (step S311), and finishes the category-based fitting value calculation process.

$$M_J = 100 \cdot \frac{Wa \cdot Ha + Wb \cdot Hb + Wc \cdot Hc + Wd \cdot Hd}{Wa \cdot Na + Wb \cdot Nb + Wc \cdot Nc + Wd \cdot Nd} \quad (1)$$

where Wa, Wb, Wc, wd are parameters having a relationship of Wa<Wb<Wc<Wd and set so that Wa=1, Wb=3, Wc=6, Wd=30.

After obtaining six pieces of category-based fitting values by executing this category-based fitting value calculation process in each of steps S204 through S209 (FIG. 7), the control unit 11 calculates in step S210 a synthetic fitting value M by calculating an average value of six pieces of category-based fitting values $M_J$.

Subsequently, the control unit 11 judges whether the processes for all pieces of property information contained in the fitting value calculation target property information suite, are completed (step S211). If the processes for all the property information are not yet completed (step S211; NO), the control unit 11 loops back to step S203 and executes the process for the next property information.

Then, when completing the processes for all pieces of property information contained in the fitting value calculation target property information suite (step S211; YES), the control unit 11 finishes the fitting value calculation process, and creates, as shown in FIG. 5, a result-of-search list page on the basis of the fitting value calculation target property information suite and a synthetic fitting value suite obtained by calculating the synthetic fitting values with respect to the respective pieces of property information that form the fitting value calculation target property information suite (step S118).

Next, the control unit 11, as shown in FIG. 6, displays the thus created result-of-search list page on the target terminal (step S121), and waits for the target user's indication (user's manipulation on the result-of-search list page) to be inputted (step S122).

Figure 9:
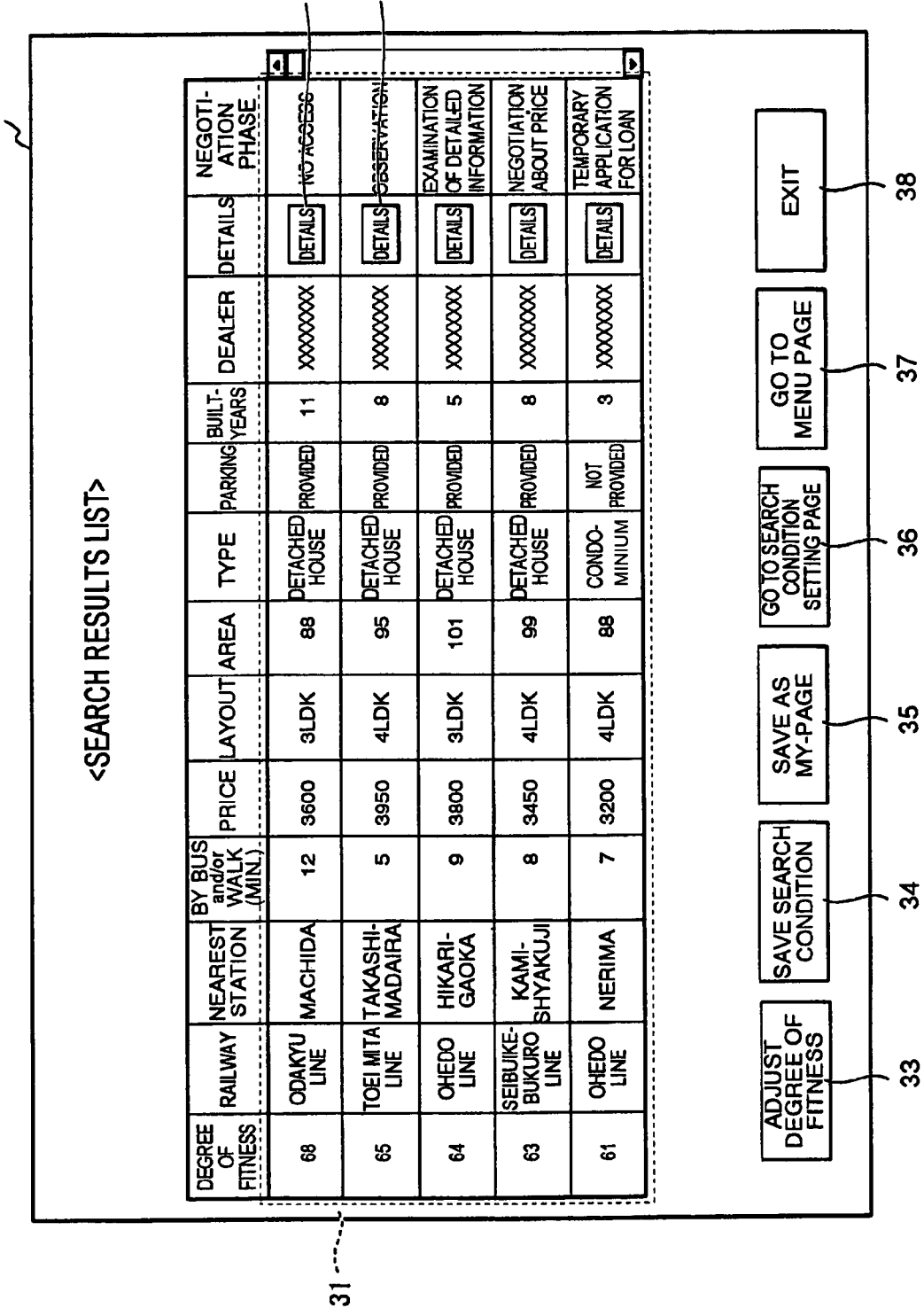
FIG. 9 is an explanatory diagram showing a result-of-search list page displayed on a target terminal.

FIG. 9 shows one example of a result-of-search list page 30 displayed on the target terminal. As shown in FIG. 9, the result-of-search list page 30 contains a list area 31 in which pieces of information (railways, the nearest stations, prices etc.) showing an outline of the property, are listed up in the descending order of the synthetic fitting values ("degree of fitness" in the figure) derived. Further, the result-of-search list page 30 is provided with a scroll bar, a "DETAILS" button 32, a "SAVE AS MY-PAGE" button 35 etc.

The scroll bar is a control manipulated by the user in order to scroll the in-area information. When this scroll bar is manipulated, the target terminal changes the contents displayed on the result-of-search list page 30 without transferring and receiving the information to and from the control unit 11.

The "DETAILS" button 32 is a button pressed by the user when wishing to know details of the property. When a certain "DETAILS" button 32 is pressed, the target terminal transmits to the control unit 11 a piece of information indicating a property corresponding to the pressed "DETAILS" button 32.

When receiving this piece of information (step S122, step S123; details), the control unit 11 stores information that the detailed display is indicated (a detail browse count is incremented by "1") in the property management record 122 pertaining to the specified property within the property database 12 (step S127). Subsequently, the control unit 11 displays a property details page related to the specified property on the target terminal (step S128), and waits for user's indication to be inputted (step S129).

Figure 10:
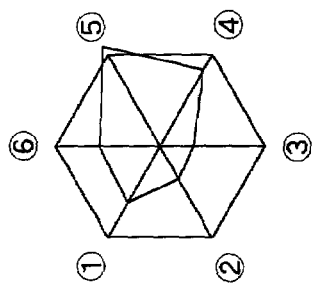
FIG. 10 is an explanatory diagram showing a property detail page displayed on the target terminal.

As shown in FIG. 10, an property detail page 40 displayed on the target terminal by the control unit 11 is provided with an area 41 for showing the synthetic fitting values (the degree of fitness in FIG. 10), an area 42 for displaying a layout and an external configuration of the house, two buttons (a "LAYOUT" button and an "EXTERIOR" button) for selectively displaying one of the layout and the external configuration in the area 42, an area 43 in which a relationship between the six category-based fitting values is displayed as a radar chart, an area 44 in which the detailed information on the property is shown, and an area 45 for showing the six category-based fitting values. Moreover, the property detail page 40 is also provided with a "SAVE AS MY-PAGE" button 46, a "RETURN" button 47 and an "EXIT" button 48.

The "SAVE AS MY-PAGE" button 46 is pressed by the user when storing the property detail page 40 displayed. The "RETURN" button 47 is pressed by the user when displaying the result-of-search list page 30. The "EXIT" button 48 is pressed by the user when finishing the use of the information search system 10.

In the case of pressing any one those buttons, the target terminal transmits information indicating the pressed button (a process which is ordered to execute by the user) to the control unit 11, and the control unit 11 executes the process corresponding to the information received.

To be specific, when receiving the information transmitted upon pressing the "SAVE AS MY-PAGE" button 46 (FIG. 6: step S129, step S130; saving of page), the control unit 11 executes a process of storing the member database 13 with the information, as may-page information on the target user, making reproducible the property detail page 40 displayed on the target terminal (step S131), and thereafter returns to step S129.

Further, when receiving the information transmitted upon pressing the "RETURN" button 47 (step S129, step S130; return), the control unit 11 loops back to step S121 and displays again the result-of-search list page 30 on the target terminal.

Then, when receiving the information transmitted upon pressing the "EXIT" button 48 (step S129, step S130; exit), the control unit 11 discards the fitting value calculation information and the fitting value calculation target property information suite on the target user that are stored on the RAM (FIG. 4: step S106), and comes to an exit of the processing for the target user.

Further, a "ADJUST DEGREE OF FITNESS" button 33 provided on the result-of-search list page 30 (FIG. 9) is a button pressed by the user if a relationship between the property and the degree of fitness (the synthetic fitting value) shown on the result-of-search list page 30 and a relationship between the property and the category-based fitting value shown on the property detail page 40 displayed upon pressing the "DETAILS" button 32, do not suit a user's own sense. Further, a "SAVE SEARCH CONDITION" button 34 is pressed by the user when saving the search conditions under which the result-of-search list page 30 displayed is obtained. The "SAVE AS MY-PAGE" button 35 is pressed by the user when saving the result-of-search list page 30 displayed. A "GO TO SEARCH CONDITION SETTING PAGE" button 36 and a "GO TO MENU PAGE" button 37 are buttons pressed by the user when displaying again the search condition setting page and the menu page. An "EXIT" button 38 is pressed by the user when finishing the use of the information search system 10.

If any one of those buttons is pressed, the target terminal transmits the information corresponding to the button pressed to the control unit 11.

The control unit 11 receiving this piece of information executes a process corresponding to the button pressed as shown in FIG. 6.

Namely, when receiving the information transmitted upon pressing the "SAVE AS MY-PAGE" button 35 (step S122, step S123; saving of page), the control unit 11 executes a process of storing the member database 13 with the information, as may-page information on the target user, making reproducible the result-of-search list page 30 displayed on the target terminal (step S124), and thereafter returns to step S122.

Further, when receiving the information transmitted upon pressing the "SAVE SEARCH CONDITION" button 34 (step S122, step S123; search condition saving), the control unit 11 executes a process of storing the member database 13 with the setting content information and the fitting value calculation information stored on the RAM as the search condition information on the target user (step S125), and thereafter returns to step S122.

Moreover, when receiving the information transmitted upon pressing the "go to menu page" button 37 (step S122, step S123; go to menu page), the control unit 11 loops back to step S104 in FIG. 4, wherein the control unit 11 displays again the menu page on the target terminal.

When receiving the information transmitted upon pressing the "go to search condition setting page" button 36 (step S122, step S123; go to search condition setting page), the control unit 11 loops back to step S111 in FIG. 5, wherein the control unit 11 displays again the search condition setting page on the target terminal.

When receiving the information transmitted upon pressing the "EXIT" button 38 (step S122, step S123; exit), the control unit 11 discards pieces of fitting value calculation information on the target user that are stored on the RAM (FIG. 4: step S106), and comes to an exit of the processing for the target user.

Then, when receiving the information transmitted upon pressing the "ADJUST DEGREE OF FITNESS" button 33 (step S122, step S123; adjustment), the control unit 11 executes a customizing process defined as a process of changing the fitting value calculation information for the target user that is stored on the RAM in accordance with an indication given from the target user (step S126).

Before making a detailed description of this customizing process, herein, a step (step S308 in FIG. 8) of calculating a fuzzy fitting value that is done by using of the fitting value calculation information will be specifically explained.

As already explained, the fitting value calculation information prepared on the RAM is the aggregation of the parameter sets used for calculating the fuzzy fitting value with respect to each condition item.

When calculating the fuzzy fitting value relative to a certain condition item in response to a request given from a certain target user, the control unit 11 reads the parameter set for calculating the fuzzy fitting value pertaining to this condition item from the fitting value calculation information for the target user, which is stored on the RAM.

To be more specific, according to the present information search system 10, the parameter set for calculating the fitting values relative to the condition items (which will hereinafter be referred to as first type condition items) of which only the upper limit values are specified by the user such as a purchase period (the number of months ranging from a date of executing the search up to a purchase time limit), a commute-to-office time, a commute-to-school time and so on, consists of 21 pieces of parameters used as element values of an array P for defining a configuration of the fitting value calculation function.

Figure 11:
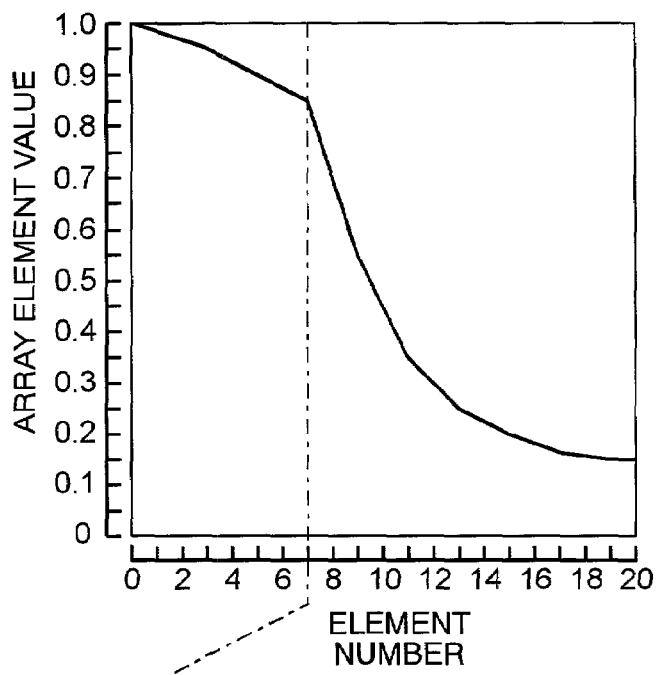
FIG. 11 is an explanatory diagram showing a configuration of a function used for calculating a fitting value relative to a condition item of which only an upper limit value is specified.

When calculating the fitting value with respect to the first type condition item, the control unit 11 reads the parameter set (consisting of 21 parameters) for calculating the fuzzy fitting value with respect to the first type condition item from the fitting value calculation information for the target terminal user, which is prepared on the RAM, and stores these parameters as P(0)~P(20). Note that default values (which are values when the customizing process is not executed) of P(0)~P(20) are, as schematically shown in FIG. 11, exhibit a difference in gradient of a variation quantity of the element value with respect to a change in the element number, wherein the element value P(7) of the element number 7 is a borderline (between a gentle decrease in the element value before the element number 7 and a sharp decrease in the element value after the element number 7).

Then, the control unit 11 calculates $\alpha$ in the formula (2) from an upper limit values X specified for the first type condition item of which the fitting values should be calculated and property corresponding values Z (such as the number of months up to an actually purchasable date that is contained in the target property information, and an actual commute-to-office time and an actual commute-to-school time obtained from the target property information with reference to the map information database 14) defined actual values with respect to the first type condition item of the target property. Subsequently, the control unit 11 calculates a fitting value Mc relative to the first type condition item from $\alpha$ calculated and P(0)~P(20) in the formula (3).

$$\alpha = 7 \cdot \frac{Z}{X} \tag{2}$$

$$M_c = (\alpha - \text{int}(\alpha)) \cdot P(\text{int}(\alpha+1)) + (\text{int}(\alpha+1) - \alpha) \cdot P(\text{int}(\alpha)) \tag{3}$$

In short, the fitting value Mc is calculated in such a step that the fitting value=P(7) when the upper limit value X gets coincident with the property corresponding value Z.

Figure 12:
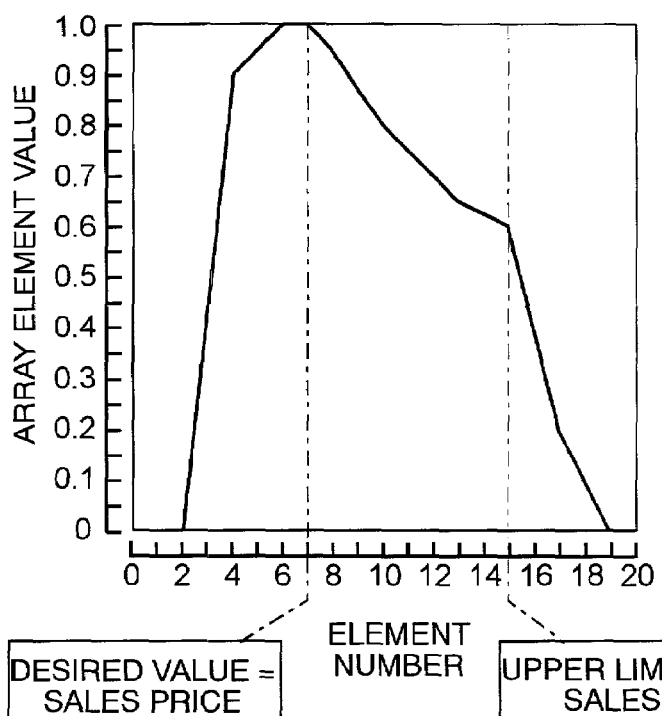
FIG. 12 is an explanatory diagram showing a configuration of a function used for calculating a fitting value relative to a condition item of which a desired value and an upper limit value are specified.

Further, according to the present information search system 10, a configuration of the fitting value calculation function related to a price of which a desired value and an upper value may be specified by the user, is defined by the array P containing the 21 elements. The array P of the default values for calculating the fitting values about the price is, however, as schematically shown in FIG. 12, exhibits differences in gradient of the variation quantity of the element value with respect to a change in the element number, wherein the elements of the element numbers 7 and 15 are borderlines (between an increase in the element value of the element numbers 2 through 7 with an increase in the element number, a decrease in the element value of the element number 7 or larger, exhibiting such a contrast that a degree of the decrease in the element value of the element number 15 or larger with the increase in the element number, is greater than a degree of the decrease in the element value of the element numbers 7 through 15 with the increase in the element number).

Then, the control unit 11 calculates $\alpha$ in the formula (4) from a desired value Xmin and an upper value Xmax that are specified by the user and from the property corresponding value (actual sales price) Z contained in the target property information, and further calculates the fitting value Mc about the price by substituting $\alpha$ calculated into the formula (3).

$$\begin{aligned}\alpha &= 7 \cdot \frac{Z}{X\min} & (Z \leq X\min) \\ &= 7 + 8 \cdot \frac{Z - X\min}{X\max - X\min} & (X\min \leq Z \leq X\max) \\ &= 15 \cdot \frac{Z}{X\max} & \left(X\max \leq Z \leq \frac{20}{15} \cdot X\max\right)\end{aligned} \tag{4}$$

Namely, the fitting value Mc is calculated so that the fitting value=P(7) when Xmin becomes coincident with Z, and the fitting value=P(15) when Xmax becomes coincident with Z.

Note that if $\alpha$ exceeds 20 (when a relationship of Z>20/15·Xmax is established), the control unit 11 calculates the fitting value Mc by use of not the formula (3) but a formula "Mc=P(20)".

Figures 13, 14:
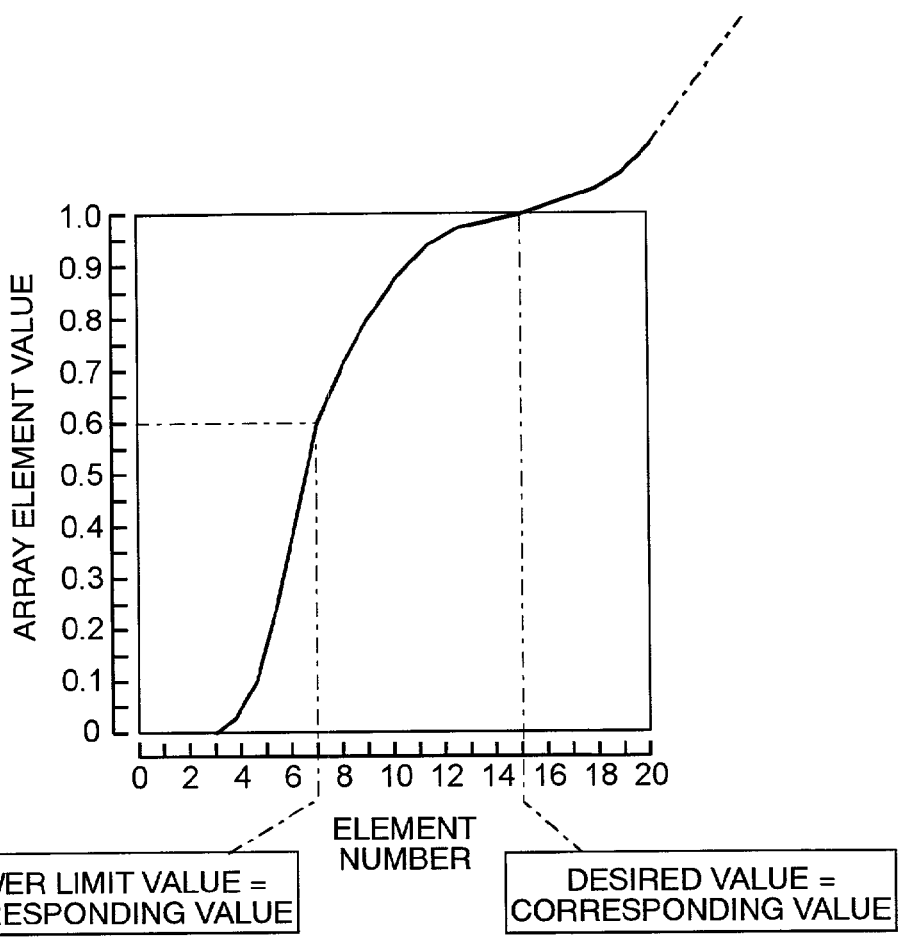
FIG. 13 is an explanatory diagram showing a configuration of a function used for calculating a fitting value relative to a condition item of which a lower limit value and a desired value are specified.
FIG. 14 is a diagram showing a structure of a table stored with LD compensation values used for calculating the fitting values about a house layout.

Further, a configuration of the fitting value calculation function related to an area of which a desired value and an upper value may be specified by the user, is defined by the array P containing the 21 elements. Then, the array P, adopted herein, of the default values for defining the fitting value calculation functions about the area, is what is schematically shown in FIG. 13 (the element value of the element number 7 is 0.6, the element value of the element number 15 is 1.0, and the element value rises with the increase in the element number).

Then, the control unit 11 calculates the fitting value Mc about the area by use of the formulae (4) and (2) from the lower limit value Xmin and the desired value Xmax specified by the user and from the property corresponding value (actual area) Z contained in the target property information.

Note that if $\alpha$ is over 20, the control unit 11 calculates the fitting value Mc by the formula "Mc=P(20)+($\alpha$−20)·0.5/8".

Moreover, the control unit 11 calculates the fitting value Mc about an azimuth facing to the road by the formula "Mc=(100−n)·W+n", where n is an assessment point of a house of which the azimuth facing to the road is the north in the case of giving 100 points as the assessment point of a house of which the azimuth facing to the road is the south, and W (the azimuth facing to the road) is a function taking values of 1.0, 0.85, 0.7, 0.5, 0.4 when the azimuth facing to the road is the south, the southeast, the southwest, the east and the west, and taking "0" when the azimuth facing to the road is one of other azimuths (the northwest, the northeast and the north) excluding the above azimuths.

Further, the control unit 11 calculates the fitting value about the layout of the house by the following formula:

Layout Fitting Value=LD Compensation Value·K Compensation Value·Storage Compensation Value·Bedroom Compensation Value In this formula, the LD compensation values are, as schematically shown in FIG. 14, predetermined values each given to a combination of a state about the living (L) and dinning (D) rooms of the target property and a condition value (buyer's desired condition) about the LD.

The K compensation value is a value taking "0" if the target property does not have a kitchen on condition that the calculation of the fitting value takes into consideration whether the kitchen is provided or not, and taking "1" in cases other than this (the K compensation value is obtained from the condition value about whether the kitchen is provided or not and from a function with the state data about whether the kitchen is provided or not).

The storage compensation value is a value taking "1" in cases where the property is provided with both the storeroom (S) and the walking closet (W) when the user desires that the property be furnished with the storeroom (S) or the walking closet (W), and where "the Number of Bedrooms−the Required Number of Bedrooms>1" is established though the property is provided with neither S nor W when the user desires that the property be furnished with S or W, and taking "0" in cases other than the above. Note that the reason why the storage compensation value is set to "1" when "the Number of Bedrooms−the Required Number of Bedrooms>1" is established, is that the remaining bedroom are usable for storage.

The bedroom compensation value is a value taking "0", "0.6", "1.0", "1.2", "1.5" respectively when "the Required Number of Bedrooms−the Number of Bedrooms≧2", "the Required Number of Bedrooms−the Number of Bedrooms=1", "the Required Number of Bedrooms−the Number of Bedrooms=0", "the Required Number of Bedrooms−the Number of Bedrooms=−1", and "the Required Number of Bedrooms−the Number of Bedrooms≦−2". Note that the property is, though furnished with neither S nor W, given a relationship of "the Number of Bedrooms−the Required Number of Bedrooms>1", and therefore, if the storage compensation value is set to "1", this bedroom compensation value is determined by using the number of bedrooms obtained by subtracting 1 from the actual number of bedrooms.

In short, the fitting value about the layout becomes "1" when the layout of the target property gets coincident with the layout desired by the target user. This fitting value becomes a value over "1" when the layout of the target property becomes larger (having extra rooms) than the layout desired by the target user. The fitting value, if there are deficiencies in the living (L) room, the dinning (D) room, the storeroom and the bedroom, decreases corresponding to types and the number of the deficient rooms. The fitting value about the layout is thus calculated in the steps described above.

Further, when calculating the fitting values Mc with respect to the number of food shops (such as a fish shop, a meat shop, a fruit and vegetable shop, a supermarket etc.), the number of restaurants (such as a so-called restaurant, a sushi-restaurant, a Chinese needle restaurant, a Chinese restaurant etc.), the number of other stores (a barber shop, a beauty shop, an electric appliance shop, a furniture shop, a clothing shop etc.), the number of medical facilities, and the number of financial institutions, the control unit 11 specifies the number of the shops, the number of facilities and the number of institutions existing within accessible locations from the target property by searching the database 14 on the basis of an address of the target property. Then, the control unit 11 calculates the fitting value Mc by dividing the specified number by the specified-by-the-user number.

The customizing process is a process capable of changing the contents of the array P (the parameter sets) relative to the individual condition items in which the configuration of the fitting value calculation function is determined by the array P.

Figure 15:
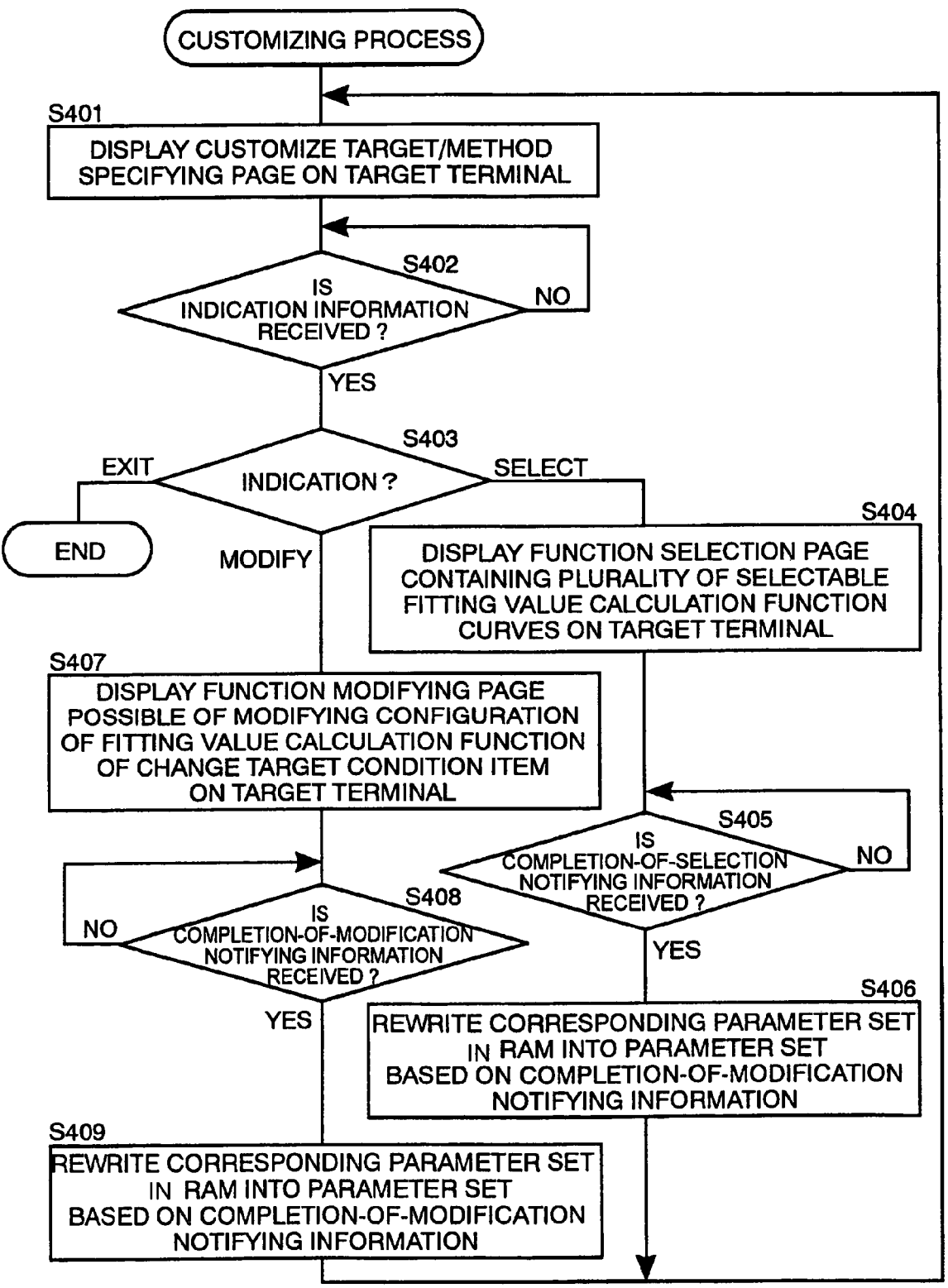
FIG. 15 is a flowchart showing a customizing process executed by the control unit.

FIG. 15 is a flowchart showing the customizing process.

As shown in FIG. 15, when in the customizing process, the control unit 11 executes a process of displaying a customize target/method specifying page on the target terminal (step S401). This customize target/method specifying page is provided with a condition item select box for selecting a condition item in which the function for calculating the fitting value is changed, a selection specifying radio button that is clicked on when selecting one of the calculation functions to change the calculation function, a modification specifying radio button (grouped with the selection specifying radio button) that is clicked on when changing the calculation function by modifying a configuration thereof, a "determine" button and a "cancel" button. Then, the target terminal displaying the customize target/method specifying page, when the "determine" button is pressed, transmits to the control unit 11 pieces of indication information containing information (showing the condition item specified by the user as a change target of the fitting value calculation function) displayed in the condition item select box, and information indicating the radio button clicked on.

Figure 16A:
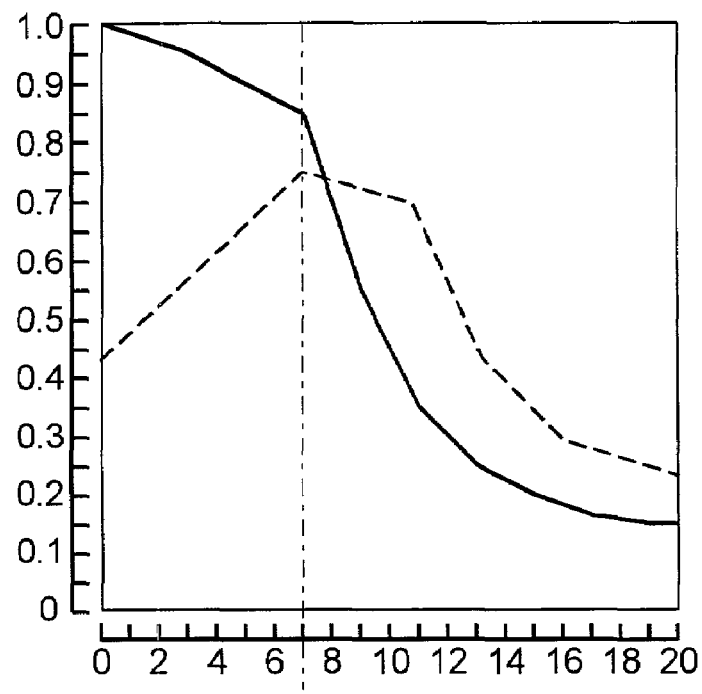
FIGS. 16A and 16B are explanatory diagrams each showing a graph area provided on a function selection page.
Figure 16B:
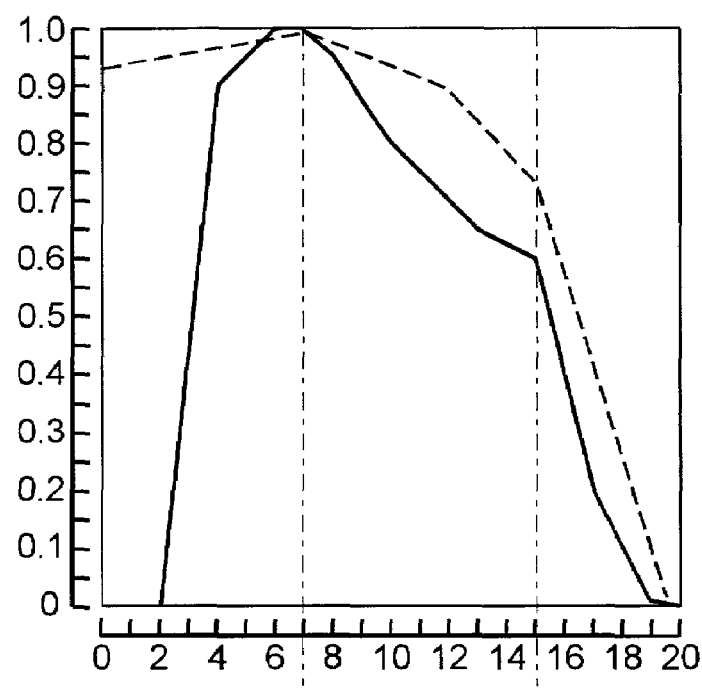

If the indication information received indicates that the calculation function is changed by selecting the calculation function, the control unit 11 displays on the target terminal a function selection page containing a graph area showing a plurality of fitting value calculation function curves for the condition items specified as the change targets by the indication information, a "determine" button and so forth (step S404). Specifically, the control unit 11, if the condition item is a purchase period, displays on the target terminal the function selection page containing the graph area shown in FIG. 16A. The control unit 11, if the condition item is the purchase period, displays on the target terminal the function selection page containing the graph area shown in FIG. 16B.

The target terminal displaying the function selection page, when the user does mouse-clicking on a certain fitting value calculation function curve displayed in the graph area, displays this calculation function curve in solid line and displays other calculation function curves in dotted lines. Then, the target terminal, when the "determine" button is pressed, transmits to the control unit 11 a piece of completion-of-selection notifying information showing which calculation function curve is selected (displayed in the solid line).

In the case of receiving the completion-of-selection notifying information (step S405; YES), the control unit 11 rewrites the parameter set (a part of the fitting value calculation information) with respect to the condition item specified as the change target on the RAM into a parameter set corresponding to a content of the completion-of-selection notifying information (step S406). Thereafter, the control unit 11 goes back to step S401, and displays again the customize target/method specifying page on the target terminal.

On the other hand, if the indication information received indicates that the calculation function is changed by modifying the configuration thereof (step S403; modify), the control unit 11 displays on the target terminal a function modifying page containing a graph area showing a fitting value calculation function curve at the present time about the condition item specified as the change target by the indication information, the "determine" button and so forth (step S407).

Figure 17:
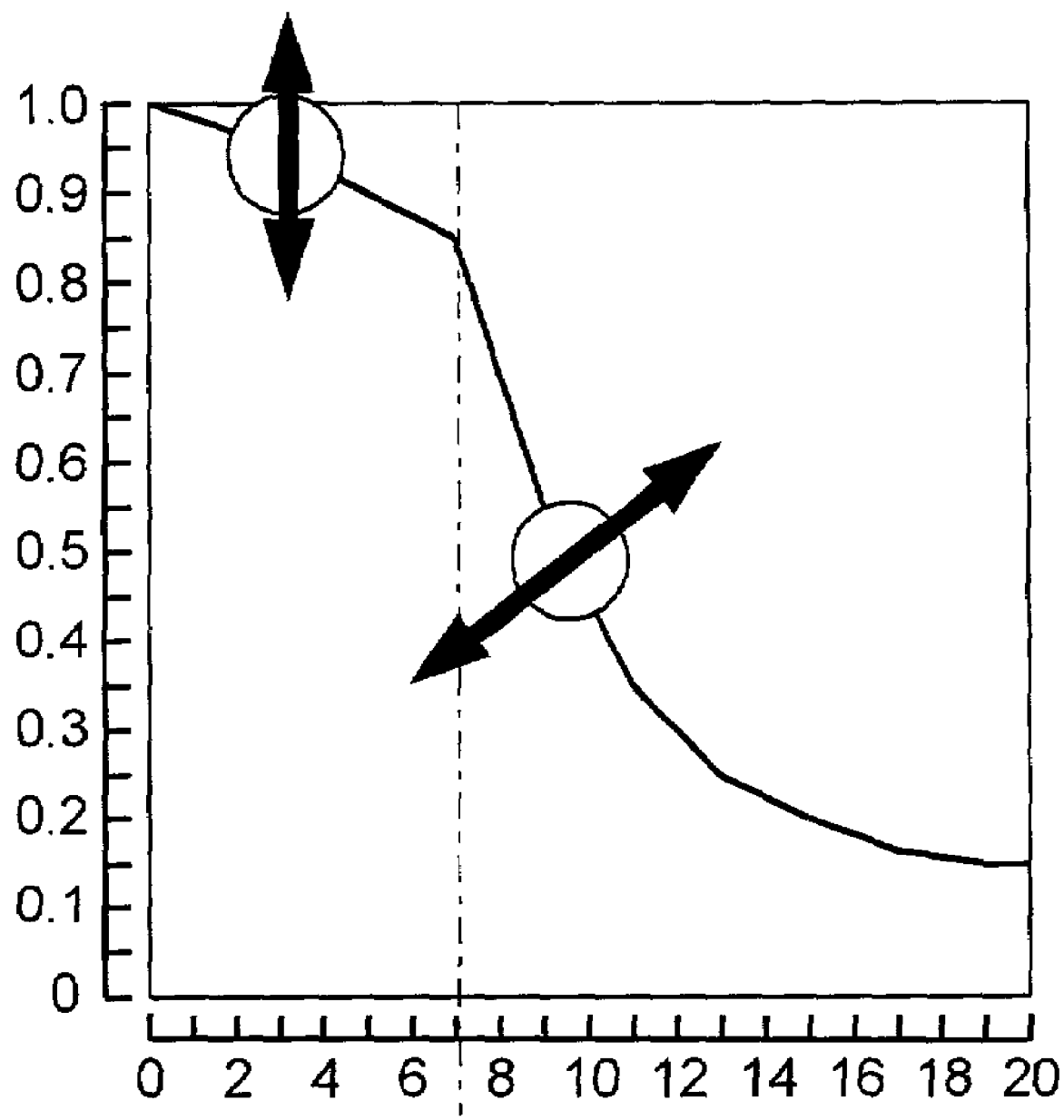
FIG. 17 is an explanatory diagram showing a graph area provided on a function modification page.

The graph area on this function modifying page is, as schematically illustrated in FIG. 17, structured so that the configuration of the fitting value calculation function curve displayed therein can be changed by use of the mouse. The target terminal, when the "determine" button is pressed, transmits to the control unit 11 pieces of completion-of-modification notifying information (containing 21 pieces of values) containing the information showing the configuration of the fitting value calculation function curve at that point of time.

In the case of receiving the completion-of-modification notifying information (step S408; YES), the control unit 11 rewrites the parameter set (a part of the fitting value calculation information) with respect to the condition item specified as the change target on the RAM into a parameter set corresponding to a content of the completion-of-modification notifying information (step S409). Thereafter, the control unit 11 goes back to step S401, and displays again the customize target/method specifying page on the target terminal.

Then, when receiving the indication information transmitted upon pressing the exit button (step S403; exit), the control unit 11 finishes the customizing process, and executes the already-explained processes from step S117 onwards in FIG. 5. As a result, the target terminal displays the result-of-search list page 30 on which the properties are sorted out in sequence of the synthetic fitting values using the fitting value calculation function changed by the user and the synthetic fitting value in which the category-based fitting values are calculated and from which a new fitting value calculation target property information suite is calculated with respect to the already-prepared fitting value calculation target property information suite.

Next, an operation of the control unit 11 for an access from the real estate agent will be explained.

The real estate agent, when using the present information search system 10, operates a computer terminal 90 to transmits an HTTP request (which will hereinafter be called a log-in page request) having predetermined contents, which is to be received by the control unit 11.

Figure 18:
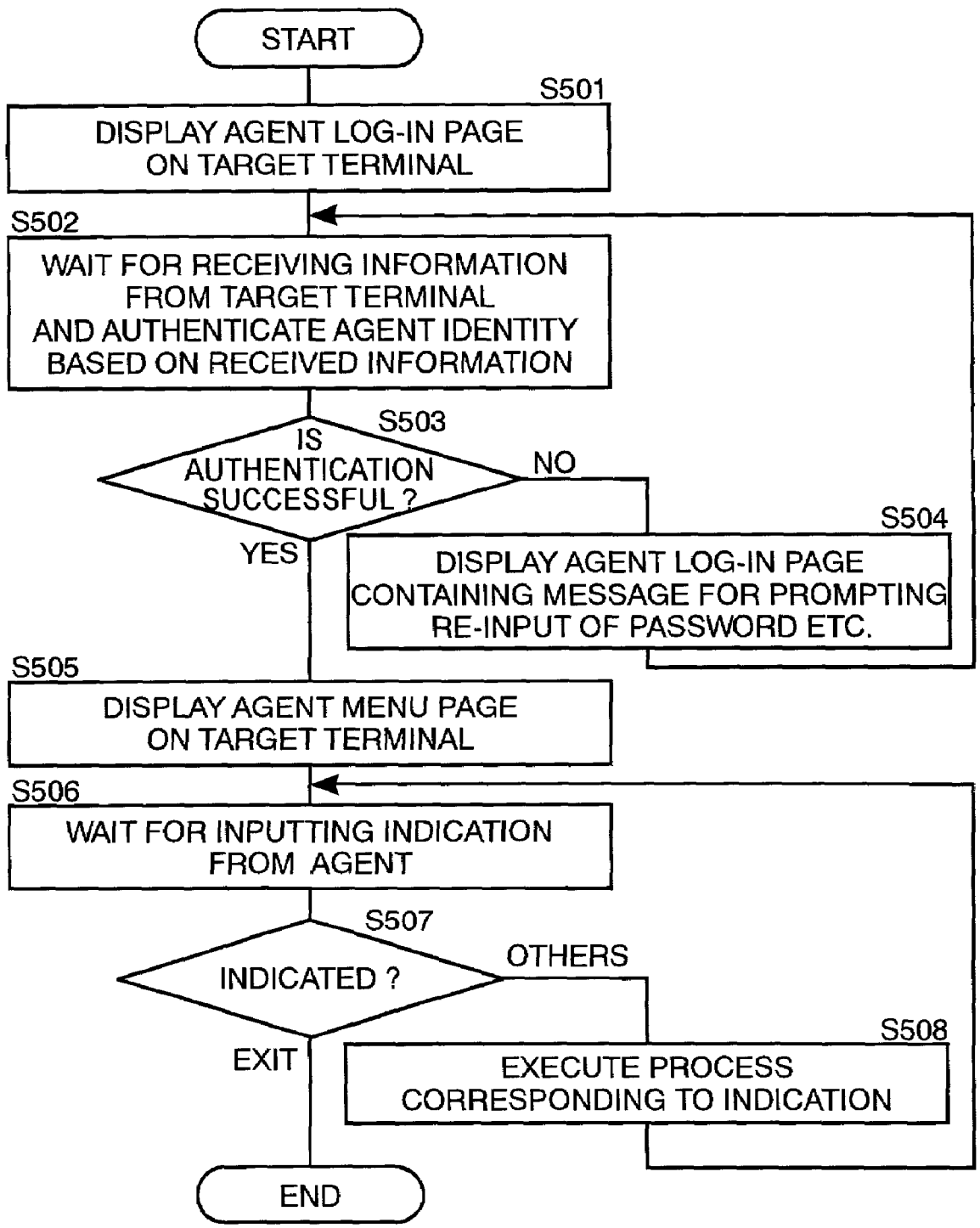
FIG. 18 is a flowchart showing operating steps of the control unit with respect to an access from a real estate agent.

The control unit having received this log-in page request supplies, as shown in FIG. 18, the HTML data, thereby displaying a log-in page for the real estate agent on the computer terminal 90 (which will hereinafter be referred to as a target terminal) having transmitted the log-in page request (step S501). This agent log-in page is provided with an input box for inputting an agent ID, an input box for inputting a password, and a log-in button pressed by the agent after inputting the agent ID and the password to these two input boxes. Then, the target terminal displaying this agent log-in page, when the log-in button is pressed, transmits onto the Internet a predetermined formatted piece of information for notifying the control unit 11 that the log-in button is pressed and of the agent ID and the password inputted to those two input boxes.

On the other hand, the control unit 11 having displayed the agent log-in page on the target terminal instep S501, waits in subsequent step S502 for receiving the information that is to be transmitted by the target terminal upon pressing the log-in button provided on the agent log-in page. Then, when receiving the information, the control unit 11 tries to authenticate an agent identity based on the agent ID and the password contained in that item of information. Namely, the control unit 11 judges whether the combination of the agent ID and the password are stored in an agent management table 121 is the property database 12.

If unable to authenticate the agent identity (step S503; NO), the control unit 11 displays on the target terminal the agent log-in page displaying a message for prompting the agent to re-input the password and so on (step S504), and returns to step S502.

Then, if able to authenticate the agent identity (step S503; YES), the control unit 11 displays an agent menu page on the target terminal (step S504). Thereafter, the control unit 11 executes a variety of processes in steps S506~S508.

Specifically, the agent menu page displayed on the target terminal by the control unit 11, is provided with a register button pressed by the agent when registering the property, first and second customer search buttons pressed by the agent when searching for the members suitable for receiving an introduction of the property, a state display button pressed by the agent when confirming states of all the properties dealt with, and an exit button pressed by the agent when finishing the use of the information search system 10. Then, the target terminal displaying this agent menu page, when the button on the agent menu page is pressed, transmits a piece of information indicating the button pressed to the control unit 11.

Figure 19:
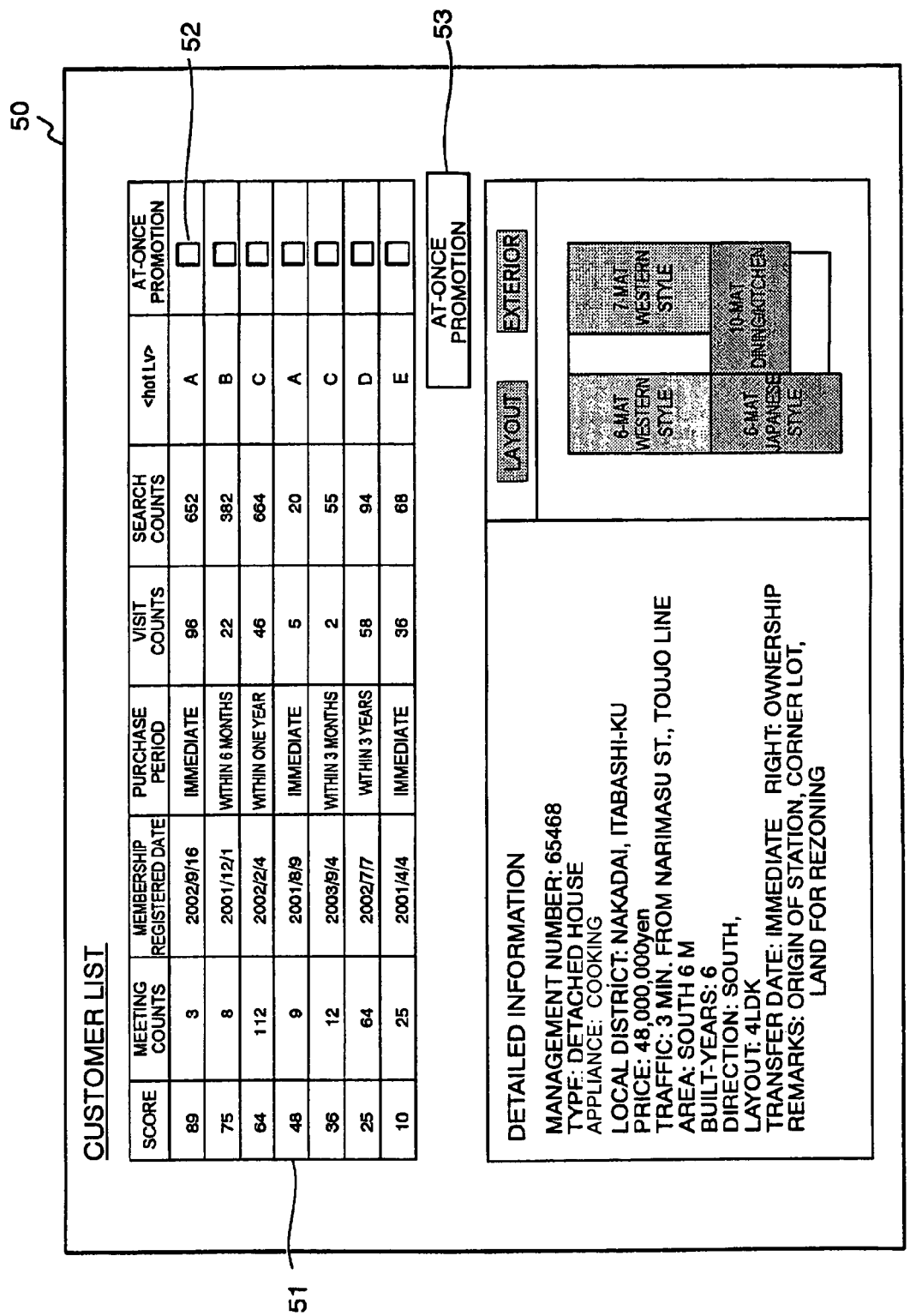
FIG. 19 is an explanatory diagram showing a customer list page displayed on the target terminal.

Subsequently, the control unit 11, when receiving the information transmitted upon pressing the first customer search button (step S507; others), displays in step S508 a Web page containing input boxes for inputting a management number etc. on the target terminal. Then, in step S506, the control unit 11 waits for the information containing the management number to be transmitted from the target terminal displaying the Web page. When this item of information is transmitted (step S507; others), the control unit 11, in step S508, based on the property information identified by the management number contained in that item of information and on the state information, displays on the target terminal a relevant customer list page 50 including an area 51 in which to display, as shown in FIG. 19, a list of data about the members who are interested in the property information of that property.

Figure 20:
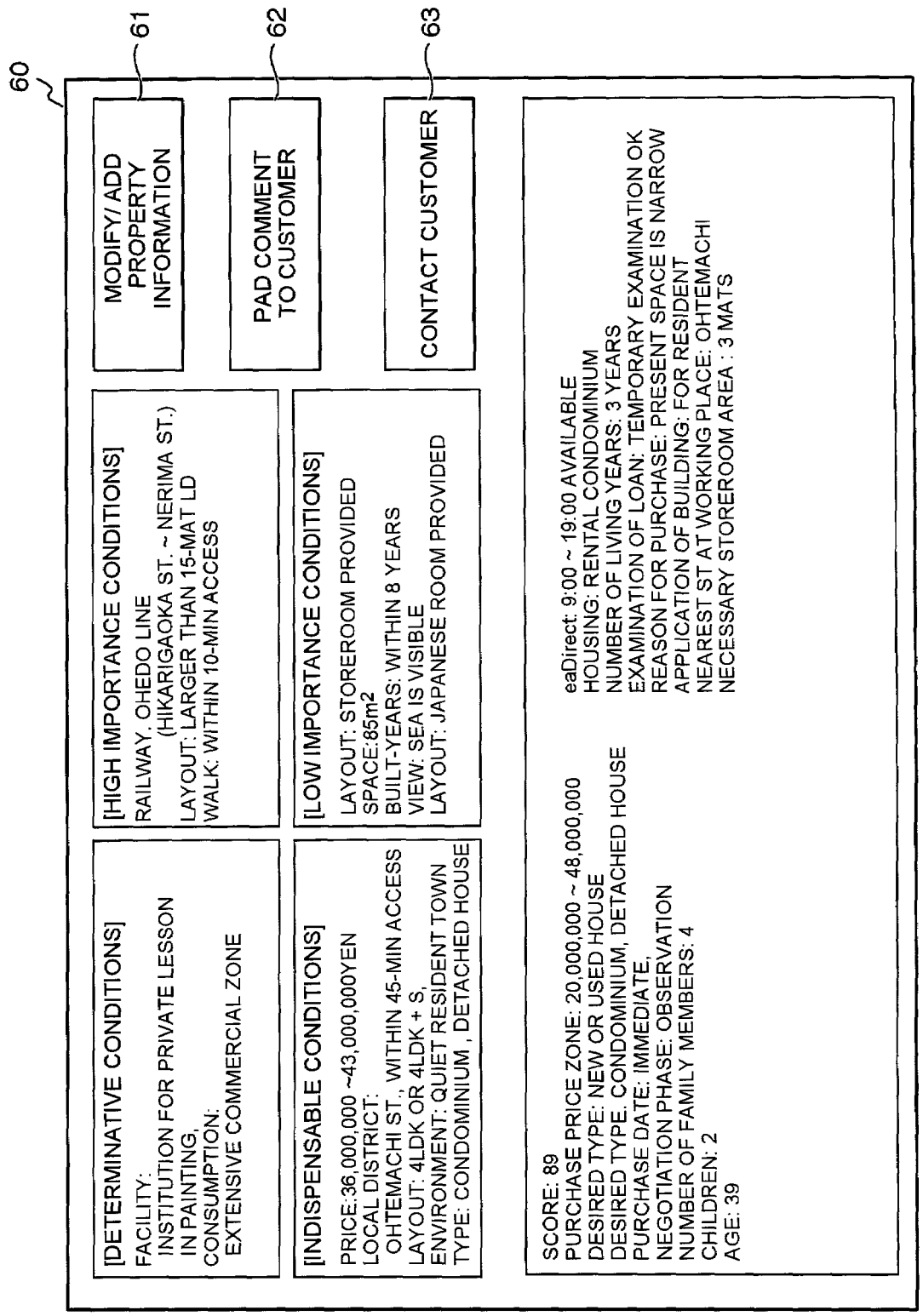
FIG. 20 is an explanatory diagram showing a customer detail page displayed on the target terminal.

The target terminal displaying this customer list page 50, when a record of data about one of the members entered in the area 51 is selected (double clicked by the mouse), transmits information showing the selected record of data to the control unit 11. Then, when receiving this item of information (step S507; others),the control unit 11 displays in step S508 on the target terminal a customer detail page 60 showing, as shown in FIG. 20, in-depth desired property conditions of the member whose data have been selected.

Note that a "CONTACT CUSTOMER" button 63 provided on this customer detail page 60 is pressed by the agent when delivering a promotion mail (that is, an E-mail in principle and a mail on cellular phones as the case may be) to the corresponding customer. A "pad comment to customer" button 62 is pressed by the agent when padding a comment into the promotion mail delivered to the corresponding customer. Further, an "at-once promotion button" 53 provided on the customer list page 50 is pressed by the agent when delivering the promotion mail to the customer with an at-once promotion check box 52 checked. Further, a "MODIFY/ADD PROPERTY INFORMATION" button 61 provided on the customer detail page 60 is pressed by the agent when adding a piece of information to (or modifying) the property information on the customer whose detailed data are displayed on the customer detail page 60.

Further, the control unit 11, when receiving the information transmitted upon pressing the second customer search button provided on the agent menu page (step S507; others), displays in step S508 on the target terminal a Web page containing a setting box for setting the management number, and a variety of setting boxes (for setting various conditions in order to expand a range of the user's condition to be searched) for setting allowable-width specifying data for specifying widths of the desired price and desired area of the property that are conceived coincident with the conditions by percentage with respect to the actual values. Then, the control unit 11 waits in step S506 for the information containing the management number etc. to be transmitted from the target terminal displaying that Web page. When receiving this item of information (step S507; others), in step S508, the control unit 11 searches for the users exhibiting a comparatively high possibility of buying the property identified by the management number by use of the property information identified by the management number contained that item of information and the allowable-width specifying data as well. Then, the control unit 11, based on a result of the search, creates a Web page having the same contents as those shown in FIG. 20, and displays this Web page on the target terminal.

Further, the control unit 11, when receiving the information transmitted upon pressing the register button provided on the agent menu page (step S507; others), displays in step S508 on the target terminal an property information registration page on which the property information and the dealer information can be set. Subsequently, the control unit 11, in step S506, waits for the information set on the property information registration page to be transmitted from the target terminal displaying this property information registration page. When receiving this item of information (step S507; others), the control unit 11, in step S508, adds the property record 122 having contents corresponding to the received information to the property database 12, and calculates the fitting value of that property to each of the members whose search condition information has been stored on the member database 13. The steps of calculating the fitting vale in this case are the same as the fitting value calculation steps explained referring to FIGS. 7 and 8, and hence the repetitive explanation is omitted. Then, the control unit 11 creates the customer list page 50 on which pieces of data about the members are sorted out in the descending order of the calculated fitting values, and displays this page 50 on the target terminal.

Further, the control unit 11, when receiving the information transmitted upon pressing the state display button provided on the agent menu page (step S507; others), in step S508, displays on the target terminals an property management page 70 on which various categories of information about the properties on a branch-office-basis are displayed as shown in FIG. 21.

Then, the control unit 11, in the case of receiving the information transmitted upon pressing the exit button on the agent menu page (step S507; exit), finishes the process shown in FIG. 18.

As discussed above, the present information search system 10 can be utilized by the members and the real estate agents in the following steps.

The user obtaining the membership performs at first a operation of definitely specifying the conditions about the property the user himself or herself wants to acquire and pressing the search button on the search condition setting page, or an operation of pressing the recommend button without specifying the concrete conditions.

With this operation, the result-of-search list page 30 is displayed, and hence the user (the member) refers to the property detail page 40 as the necessity may arise, thereby judging whether a relationship between the degree of fitness (the synthetic fitting value) and the property and a relationship between the category-based fitting values indicated on the property detail page 40 and the property, are in suit with the user's own sense. In the case of feeling that the relationship between the fitting values and the property is not suited to the member's own sense, the member presses the "ADJUST DEGREE OF FITNESS" button 33, which triggers an execution of the customizing process by the control unit 11, thereby changing the fitting value calculation functions with respect to some condition items as factors giving the calculation fitting values unsuited to the member's own sense. Thereafter, the user, with the exit of the customizing process, operates the control unit to display the result-of-search list page 30 etc., and judges whether the relationship between the fitting values and the property is suited to the user's own sense. Then, when judging that the relationship between the fitting values and the property is suited to the user's own sense, presses the "SAVE SEARCH CONDITION" button 34, thereby saving the conditions for calculating the fitting values proper to the user himself or herself in the information search system 10.

If set in this state, even when the search conditions are changed to some extent, it follows that the fitting values reliable with respect to each item of searched information are displayed, thereby making it feasible to easily judge whether each item of information forming the result of the search is important to the user himself or herself.

MODIFIED EXAMPLES

The information search system 10 in the embodiment discussed above can be modified in a variety of forms. For example, the information search system 10 retains the map information database 14, however, the map information database 14 may be retained in a system different from the information search system 10.

Further, the information search system 10 searches the property information, and thereafter calculates the fitting values about the searched property information. The information search system 10 can be, however, modified so that the fitting values about all pieces of search target property information are calculated, and thereafter only the property information with the calculated fitting values equal to or greater than the predetermined values are presented to the user. In this case, however, there increases a quantity of the arithmetic operations that must be executed, and it is therefore desirable that the architecture exemplified in the embodiment be adopted.

What is claimed is:

1. An information search system comprising:
an information storage unit which stores personal information, including a number of family members, with respect to each of a plurality of users and a plurality of pieces of search target information;
a control unit which calculates search parameters based on the stored personal information;
a searching unit which searches, when a user specifies a search condition, for a piece of search target information satisfying the search condition and the calculated search parameters from the pieces of search target information in the information storage unit, and stores information indicating that the pieces of search target information are searched by the user into the information storage unit;
a calculating unit which calculates a fitting value indicating how much the search target information satisfies the search condition about the respective pieces of search target information searched by said searching unit in accordance with a fitting value calculation procedure specified by the user;
a result-of-search presenting unit which presents, to the user, at least a part of information that forms each piece of search target information searched by said searching unit together with the filling value calculated by said calculating unit with respect to that piece of search target information and the search parameters calculated by the control unit; and an outputting unit which outputs, when a piece of search target information is specified, the personal information on each user by whom the piece of search target information is searched based on the pieces of information stored in the information storage unit.

2. An information search system comprising:

an information storage unit which stores personal information, including a number of family members, with respect to each of a plurality of users and a plurality of pieces of search target information;

a control unit which calculates search parameters based on the stored personal information;

a calculating unit which calculates, when a user specifies a search condition, a fitting value indicating how much search target information satisfies the search condition about the respective pieces of search target information in the information storage unit in accordance with a fitting value calculation procedure specified by the user;

an extracting unit for extracting the search target information of which the fitting value calculated by said calculating unit and the calculated search parameters satisfy predetermined conditions, out of the plural pieces of search target information in the information storage unit, and stores information indicating that the pieces of search target information are searched by the user into the information storage unit;

a result-of-search presenting unit which presents, to the user, at least a part of information that forms each piece of search target information extracted by said extracting unit together with the fitting value calculated by said calculating unit with respect to that piece of search target information and the search parameters calculated by the control unit; and an outputting unit which outputs, when a piece of search target information is specified, the personal information on each user by whom the piece of search target information is searched based on the pieces of information stored in the information storage unit.

3. An information search system comprising:

an information storage unit which atoms personal information, including a number of family members, with respect to each of a plurality of users, a plurality of pieces of search target information, search condition defining information for defining a search condition with respect to each of the plurality of users, and fitting value calculation procedure defining information for defining a procedure for calculating a fitting value indicating how much the information searched under the search condition defined by the search condition defining information satisfies the search condition;

a control unit which calculates search parameters based on the stored personal information;

a searching unit which searches, when a predetermined indication is given from any one of the plurality of users, for the search target information in the information storage unit that satisfies the search condition defined by the search condition defining information stored in said information storage unit with respect to one of the users having given the predetermined indication out of the plural pieces of search target information in the information storage unit and the calculated search parameters, and which stores information indicating that the pieces of search target information are searched by the one of the users into said information storage unit;

a calculating unit which calculates the fitting value indicating how much each piece of search target information searched by said searching unit satisfies the search condition used for searching for the search target information in the procedure defined by the fitting value calculation procedure defining information stored in said information storage unit with respect to the search permission party having given the predetermined indication;

a result-of-search presenting unit which presents, to the one of the users, at least a part of information that forms each piece of search target information searched by said searching unit together with the fitting value calculated by said calculating unit with respect to that piece of search target information and the calculated search parameters; and an outputting unit which outputs, when a piece of search target information is specified, the personal information on each user by whom the piece of search target information is searched based on pieces of information stored in the information storage unit.

4. An information search system according to claim 3, wherein the calculating unit stores each calculated fitting value as a fitting value of a corresponding piece of search target information for the user into the information storage unit, and the outputting unit outputs the personal information on each user by whom the piece of search target information is searched together with the fitting value of the piece of search target information for each user.

5. An information search system according to claim 3, wherein the plural pieces of search target information contain first type search target information permitted to be browsed by one of the users, and second type search target information inhibited to be browsed by one of the users, said searching unit searches for the search target information from the first type search target information contained in the plural pieces of search target information, and said information search system further comprises:

a second calculating unit which calculates, when the search target information to be processed is given, the fitting value indicating how much the second type search target information to be processed satisfies the search condition stored in said information storage unit about the one of the users with respect to each of the plurality of users in the procedure defined by the fitting value calculation procedure stored in said information storage unit with respect to the one of the users; and a result-of-search output unit for outputting, to each of the plurality of the users, the information on the one of the users and the fitting value calculated by said second calculating unit with respect to the one of the users.

6. An information search method comprising:

storing personal information, including a number of family members, with respect to each of a plurality of users and a plurality of search target information;

calculating search parameters based on the stored personal information;

searching, when a user specifies a search condition, for a piece of search target information satisfying the search condition and the calculated search parameters from the pieces of search target information;

storing information indicating that the pieces of search target information are searched by the user;

calculating a filling value indicating how much the search target information satisfies the search condition about the respective pieces of search target information searched in said searching in accordance with a fitting value calculation procedure specified by the user; and presenting, to the user, at least a part of information that forms each piece of search target information searched in said searching together with the fitting value calculated by said calculating with respect to that piece of search target information and the calculated search parameters; and outputting the personal information about each user by whom the piece of search target information is search based on the stored pieces of information, when the piece of search target information is specified.

7. An information search method comprising:

storing personal information, including a number of family members, with respect to each of a plurality of users and a plurality of search target information;

calculating search parameters based on the stored personal information;

calculating, when a user specifies a search condition, a fitting value indicating how much search target information satisfying the search condition about the respective pieces of search target information in accordance with a fitting value calculation procedure specified by the user;

extracting the search target information of which the fitting value calculated in said calculating and the calculated search parameters satisfy predetermined conditions, out of the plural pieces of search target information;

storing information indicating that the pieces of search target information are searched by the user;

presenting, to the user, at least a part of information that forms each piece of search target information extracted in said extracting together with the fitting value calculated in said calculating with respect to that piece of search target information and the calculated search parameters; and outputting the personal information about each user by whom the piece of search target information is search based on the stored pieces of information, when the piece of search target information is specified.

8. A computer readable medium storing a program for causing a computer to execute:

storing personal information, including a number of family members, with respect to each of a plurality of users and a plurality of search target information;

calculating search parameters based on the stored personal information;

searching, when a user specifies a search condition, for a piece of search target information satisfying the search condition and the calculated search parameters from the pieces of search target information;

storing information indicating that the pieces of search target information are searched by the user;

calculating a fitting value indicating how much the search target information satisfies the search condition about the respective pieces of search target information searched in said searching in accordance with a fitting value calculation procedure specified by the user; and presenting, to the user, at least a part of information that forms each piece of search target information searched in said searching together with the fitting value calculated by said calculating with respect to that piece of search target information and the calculated search parameters; and outputting the personal information about each user by whom the piece of search target information is search based on the stored pieces of information, when the piece of search target information is specified.

9. A computer readable storage medium storing a program for causing a computer to execute:

storing personal information, including a number of family members, with respect to each of a plurality of users and a plurality of search target information;

calculating search parameters based on the stored personal information;

calculating, when a user specifies a search condition, a fitting value indicating how much search target information satisfies the search condition about the respective pieces of search target information in accordance with a fitting value calculation procedure specified by the user;

extracting the search target information of which the filling value calculated in said calculating and the calculated search parameters satisfy predetermined conditions, out of the plural pieces of search target information;

storing information indicating that the pieces of search target information are searched by the user;

presenting, to the user, at least a part of information that forms each piece of search target information extracted in said extracting together with the fitting value calculated in said calculating with respect to that piece of search target information and the calculated search parameters; and outputting the personal information about each user by whom the piece of search target information is search based on the stored pieces of information, when the piece of search target information is specified.

10. A computer readable storage medium storing a program for making a computer function as an information search system, the program comprising:

an information storage unit which stores personal information, including a number of family members, with respect to each of a plurality of users, a plurality of pieces of search target information, search condition defining information for defining a search condition with respect to each of the plurality of users, and fitting value calculation procedure defining information for defining a procedure for calculating a fitting value indicating how much the information searched under the search condition defined by the search condition defining information satisfies the search condition;

a control unit which calculates search parameters based on the stored personal information;

a searching unit which searches, when a predetermined indication is given from any one of the plurality of users, for the search target information in the information storage unit that satisfies the search condition defined by the search condition defining information stored in said information storage unit with respect to one of the users having given the predetermined indication out of the plural pieces of search target information in the information storage unit and the calculated search parameters, and which stores information indicating that the pieces of search target information are searched by the one of the users into said information storage unit;

a calculating unit which calculates the fitting value indicating how much each piece of search target information searched by said searching unit satisfies the search condition used for searching for the search target information in the procedure defined by the fitting value calculation procedure defining information stored in said information storage unit with respect to the search permission party having given the predetermined indication;

a result-of-search presenting unit which presents, to the one of the users, at least a part of information that forms each piece of search target information searched by said searching unit together with the fitting value calculated by said calculating unit with respect to that piece of search target information and the calculated search parameters; and an outputting unit which outputs, when a piece of search target information is specified, the personal information on each user by whom the piece of search target information is searched based on pieces of information stored in the information storage unit.

11. An information search system comprising:

an information storage unit which stores search target information and personal information, including a number of family members, about a user among a plurality of users;

a control unit which calculates search parameters based on the stored personal information;

a searching unit which searches the information storage unit for the search target information satisfying a search condition specified by the user and the calculated search parameters, and which stores in the storage unit search record information that the user searched for the search target information;

a calculating unit which calculates a fitting value according to a filling value calculation procedure specified by the user, the filling value indicating a degree to which the search target information satisfies the search condition;

a presenting unit which presents at least a portion of the search target information and the fitting value corresponding to the search target information and the calculated search parameters; and an outputting unit which outputs the personal information for each of the users having a search record information corresponding to the presented search target information stored in the storage unit.

12. An information search system, comprising:

an information storage unit storing user data, including a number of family members, for each of a plurality of users and a plurality of pieces of search target information for each of the plurality of users;

a control unit which calculates search parameters based on the stored personal information;

a searching unit searching for information based on user specified search target information and calculated search parameters, and maintaining a history of searches carried out by each user;

a calculating unit calculating a synthetic fitting value and a plurality of type-based fitting values for every item searched, using fitting value calculation procedures specified by the user; and a search summary unit presenting, for each search, the search target information used, results generated by the search, a plurality of fitting values calculated for each result, and the calculated search parameters.

* * * * *

UNITED STATES PATENT AND TRADEMARK OFFICE
CERTIFICATE OF CORRECTION

PATENT NO. : 7,107,256 B2
APPLICATION NO. : 09/988251
DATED : September 12, 2006
INVENTOR(S) : Mitsuru Nakajima et al.

It is certified that error appears in the above-identified patent and that said Letters Patent is hereby corrected as shown below:

Col. 26, line 67, change "filling" to --fitting--

Col. 27, line 44, change "atoms" to -- stores--

Col. 29, line 3, change "filling" to --fitting--

Col. 29, line 26, change "satisfying" to --satisfies--

Col. 30, line 22, change "filling" to --fitting--

Col. 32, line 2, change "filling" to --fitting--

Col. 32, line 3, change "filling" to --fitting--

Signed and Sealed this

First Day of May, 2007

JON W. DUDAS
*Director of the United States Patent and Trademark Office*